United States Patent
Dunbar et al.

(10) Patent No.: US 10,587,698 B2
(45) Date of Patent: Mar. 10, 2020

(54) SERVICE FUNCTION REGISTRATION MECHANISM AND CAPABILITY INDEXING

(71) Applicant: Futurewei Technologies, Inc., Plano, TX (US)

(72) Inventors: Linda Dunbar, Plano, TX (US); Hong Zhang, Palo Alto, CA (US)

(73) Assignee: Futurewei Technologies, Inc., Plano, TX (US)

( * ) Notice: Subject to any disclaimer, the term of this patent is extended or adjusted under 35 U.S.C. 154(b) by 635 days.

(21) Appl. No.: 15/044,010

(22) Filed: Feb. 15, 2016

(65) Prior Publication Data

US 2016/0248860 A1 Aug. 25, 2016

Related U.S. Application Data

(60) Provisional application No. 62/120,761, filed on Feb. 25, 2015, provisional application No. 62/120,765, filed on Feb. 25, 2015.

(51) Int. Cl.
*H04L 29/08* (2006.01)
*H04L 29/12* (2006.01)

(52) U.S. Cl.
CPC .......... *H04L 67/16* (2013.01); *H04L 67/146* (2013.01); *H04L 61/2514* (2013.01); *H04L 61/2589* (2013.01)

(58) Field of Classification Search
CPC ...................................................... H04L 67/16
(Continued)

(56) References Cited

U.S. PATENT DOCUMENTS 6,600,749 B1 * 7/2003 Hayball ................. H04L 41/16
370/351
6,769,000 B1 * 7/2004 Akhtar ..................... H04L 29/06
(Continued)

FOREIGN PATENT DOCUMENTS

CN 101374247 A 2/2009
CN 101997721 A 3/2011
(Continued)

OTHER PUBLICATIONS

Bari et al., "On Orchestrating Virtual Network Functions", 2015 (Year: 2015).*
(Continued)

*Primary Examiner* — Ondrej C Vostal
(74) *Attorney, Agent, or Firm* — Conley Rose, P.C.

(57) ABSTRACT

A method implemented in a network engine comprising receiving, by a service function (SF) orchestrator in the network engine, a registration request message from a third-party SF manager requesting registration of a SF comprising one or more SF instances in a network, wherein the registration request message comprises vendor identification information identifying a vendor of the SF and SF identification information identifying the SF, receiving a capability information message from the third-party SF manager indicating vendor-specific capability information associated with the SF, receiving a service request message from a service client requesting a network service and one or more policies for the service, generating the network service by utilizing the one or more SF instances according to the one or more policies and the vendor-specific capability information, and sending the one or more policies to the one or more SF instances.

20 Claims, 17 Drawing Sheets

(58) Field of Classification Search
USPC .................................................... 709/228
See application file for complete search history.

(56) References Cited

U.S. PATENT DOCUMENTS

| | | | | |
|---|---|---|---|---|
| 7,552,090 | B1* | 6/2009 | Barber | G06Q 20/10 705/39 |
| 7,562,127 | B2* | 7/2009 | Sakamoto | G06F 17/30864 705/59 |
| 7,574,511 | B2* | 8/2009 | Pujol | G06F 9/46 707/999.01 |
| 7,624,265 | B1* | 11/2009 | Slyva | H04L 63/08 713/168 |
| 7,831,693 | B2* | 11/2010 | Lai | G06Q 10/10 706/27 |
| 8,781,104 | B1* | 7/2014 | Allen | H04L 12/1403 379/201.01 |
| 8,955,055 | B1* | 2/2015 | Bogdanovic | H04L 63/0892 726/4 |
| 9,038,151 | B1* | 5/2015 | Chua | H04L 45/02 709/223 |
| 9,253,636 | B2* | 2/2016 | Torres | H04W 12/06 |
| 9,338,007 | B1* | 5/2016 | Doshi | H04L 63/0815 |
| 9,633,011 | B1* | 4/2017 | Wencel | G06F 17/30 |
| 9,806,944 | B2* | 10/2017 | Contreras | H04L 41/0806 |
| 9,806,979 | B1* | 10/2017 | Felstaine | G06F 11/2002 |
| 9,843,624 | B1* | 12/2017 | Taaghol | H04L 67/10 |
| 2003/0055882 | A1* | 3/2003 | Kawamura | H04L 41/5019 709/203 |
| 2003/0144894 | A1* | 7/2003 | Robertson | G06Q 10/06 709/226 |
| 2005/0033692 | A1* | 2/2005 | Jarman | G06Q 20/02 705/41 |
| 2007/0101122 | A1* | 5/2007 | Guo | H04L 63/061 713/153 |
| 2007/0118496 | A1* | 5/2007 | Bornhoevd | H04L 67/327 |
| 2007/0130326 | A1* | 6/2007 | Raphael | H04L 41/0226 709/224 |
| 2007/0178883 | A1* | 8/2007 | Nandagopal | G06Q 20/32 455/411 |
| 2007/0208809 | A1* | 9/2007 | Westman | H04W 4/06 709/205 |
| 2007/0234414 | A1* | 10/2007 | Liu | H04L 63/0218 726/11 |
| 2007/0283012 | A1* | 12/2007 | Chu | H04L 41/022 709/225 |
| 2008/0052245 | A1* | 2/2008 | Love | G06F 21/36 705/76 |
| 2008/0076412 | A1* | 3/2008 | Khetawat | H04W 24/02 455/432.1 |
| 2008/0178169 | A1* | 7/2008 | Grossner | H04L 67/16 717/170 |
| 2009/0190577 | A1* | 7/2009 | Allen | H04L 65/1016 370/352 |
| 2009/0260032 | A1* | 10/2009 | Li | H04N 7/17318 725/39 |
| 2010/0198972 | A1* | 8/2010 | Umbehocker | G06F 3/0604 709/226 |
| 2011/0022500 | A1* | 1/2011 | Scheinfeld | G06Q 20/12 705/27.2 |
| 2012/0016775 | A1* | 1/2012 | Ramos | G06Q 30/02 705/27.1 |
| 2012/0069131 | A1* | 3/2012 | Abelow | G06Q 10/067 348/14.01 |
| 2012/0084364 | A1* | 4/2012 | Sivavakeesar | H04L 12/1818 709/205 |
| 2013/0041725 | A1* | 2/2013 | Moore | G06Q 30/0207 705/14.1 |
| 2013/0060942 | A1* | 3/2013 | Ansari | G06Q 30/04 709/225 |
| 2013/0104202 | A1* | 4/2013 | Yin | G06F 21/42 726/5 |
| 2013/0326045 | A1* | 12/2013 | Wang | H04L 63/20 709/223 |
| 2014/0006283 | A1* | 1/2014 | Hogg | G06Q 20/10 705/44 |
| 2014/0051391 | A1* | 2/2014 | Torres | H04W 12/06 455/411 |
| 2014/0289089 | A1* | 9/2014 | Stewart, Jr. | G06Q 10/0631 705/37 |
| 2014/0325038 | A1* | 10/2014 | Kis | H04L 41/0803 709/220 |
| 2014/0344756 | A1* | 11/2014 | Sato | H04L 29/08 715/835 |
| 2014/0376555 | A1* | 12/2014 | Choi | H04L 45/66 370/395.53 |
| 2015/0062166 | A1* | 3/2015 | Pan | G06T 11/60 345/633 |
| 2015/0071271 | A1* | 3/2015 | Smedman | H04W 48/18 370/338 |
| 2015/0271658 | A1* | 9/2015 | Huang | H04W 8/005 455/39 |
| 2015/0319036 | A1* | 11/2015 | Zhang | H04L 41/0863 370/216 |
| 2016/0057234 | A1* | 2/2016 | Parikh | H04L 67/16 709/226 |
| 2016/0088092 | A1* | 3/2016 | Cardona-Gonzalez | H04L 67/141 709/227 |
| 2016/0103698 | A1* | 4/2016 | Yang | G06F 11/202 714/4.11 |
| 2016/0134932 | A1* | 5/2016 | Karp | H04N 21/4431 348/155 |
| 2016/0156513 | A1* | 6/2016 | Zhang | H04W 4/70 709/220 |
| 2016/0173326 | A1* | 6/2016 | Koehler | H04L 61/1511 709/220 |
| 2016/0182499 | A1* | 6/2016 | Sharaga | H04L 63/0853 713/156 |
| 2016/0212012 | A1* | 7/2016 | Young | H04L 41/14 |
| 2016/0261495 | A1* | 9/2016 | Xia | H04L 45/58 |
| 2016/0277509 | A1* | 9/2016 | Qiang | H04L 67/16 |
| 2016/0294732 | A1* | 10/2016 | Chou | H04L 49/25 |
| 2017/0026472 | A1* | 1/2017 | Bugenhagen | H04L 67/12 |
| 2017/0054639 | A1* | 2/2017 | Zhou | H04W 76/022 |
| 2017/0078183 | A1* | 3/2017 | Civanlar | H04L 45/02 |
| 2017/0126792 | A1* | 5/2017 | Halpern | H04L 41/0896 |
| 2017/0141974 | A1* | 5/2017 | Lahiri | H04L 43/028 |
| 2017/0149614 | A1* | 5/2017 | Zheng | H04L 41/12 |
| 2017/0195254 | A1* | 7/2017 | Pham | H04L 49/25 |
| 2017/0201629 | A1* | 7/2017 | Li | H04M 15/66 |
| 2017/0214694 | A1* | 7/2017 | Yan | H04L 63/20 |
| 2017/0237667 | A1* | 8/2017 | Wang | H04L 47/125 709/226 |
| 2017/0237686 | A1* | 8/2017 | Wang | H04L 47/803 709/219 |
| 2017/0250903 | A1* | 8/2017 | Rasanen | H04L 41/50 |
| 2018/0034781 | A1* | 2/2018 | Jaeger | H04L 63/20 |
| 2018/0225139 | A1* | 8/2018 | Hahn | G06F 9/45558 |

FOREIGN PATENT DOCUMENTS

| | | |
|---|---|---|
| CN | 102171993 A | 8/2011 |
| CN | 104283891 A | 1/2015 |
| WO | 2014052485 A1 | 4/2014 |
| WO | 2014177012 A1 | 11/2014 |

OTHER PUBLICATIONS

Blendin et al., "Position Paper: Software-Defined Network Service Chaining", Sep. 2014 (Year: 2014).*

Carrozzo et al., "Network Function Virtualization: Orchestration Challenges", Nov. 2015 (Year: 2015).*

Carrozzo et al., "Recursive orchestration of federated virtual network functions", Jul. 2015 (Year: 2015).*

ETSI, "Network Functions Virtualisation (NFV); Architectural Framework", ETSI GS NFV 002, v1.1.1, Oct. 2013 (Year: 2013).*

(56) References Cited

OTHER PUBLICATIONS

ETSI, "Network Functions Virtualisation (NFV); Management and Orchestration", ETSI GS NFV-MAN 001, v1.1.1, Dec. 2014 (Year: 2014).*
Han et al., "Network Function Virtualization: Challenges and Opportunities for Innovations", Feb. 2015 (Year: 2015).*
Li et al., "Software-Defined Network Function Virtualization: A Survey", Sep. 2015 (Year: 2015).*
MiJumbi et al., "Design and Evaluation of Algorithms for Mapping and Scheduling of Virtual Network Functions", 2015 (Year: 2015).*
Quinn et al., "Service Function Chaining (SFC) Architecture", 2014 (Year: 2014).*
Quinn et al., "Service Function Chaining Problem Statement", 2014 (Year: 2014).*
Riggio et al., "Virtual Network Functions Orchestration in Enterprise WLANs", 2015 (Year: 2015).*
Soares et al., "CLoud4NFV: A Platform for Virtual Network Functions", 2014 (Year: 2014).*
Soares et al., "Toward a Telco Cloud Environment for Service Functions", Feb. 2015 (Year: 015).*
Szabo et al., "Unifying Carrier and Cloud Networks: Problem Statement and Challenges", 2016 (Year: 2016).*
Wikipedia, "Wafer (electronics)", 2018 (Year: 2018).*
Lopez et al., "Framework for Interface to Network Security Functions", Oct. 2015 (Year: 2015).*
Moore et al., "Policy Core Information Model—Version 1 Specification", RFC 3060, 2001 (Year: 2001).*
Xia et al., "Information Model of Interface to Network Security Functions Capability Interface", Oct. 2015 (Year: 2015).*
Dunbar, L., et al., "Interface to Network Security Functions Problem Statement," draft-dunbar-i2nsf-problem-statement-02.txt, Feb. 4, 2015, 18 pages.
Dunbar, L., et al., "Interface to Network Security Functions (I2NSF) Problem Statement," draft-dunbar-i2nsf-problem-statement-051.txt, May 28, 2015, 21 pages.
Bogdanovic, D., et al., "Network Access Control List (ACL) YANG Data Model," draft-ietf-netmod-acl-model-01, Feb. 5, 2015, 24 pages.
Bogdanovic, D., et al., "Network Access Control List (ACL) YANG Data Model," draft-ietf-netmod-acl-model-06, Dec. 8, 2015, 28 pages.
Xia, L., et al., "Information Model of Interface to Network Security Functions Capability Interface," draft-xia-i2nsf-capability-interface-im-00.txt, Jan. 29, 2015, 12 pages.
Pastor, A., et al., "Access Use Cases for an Open OAM Interface to Virtualized Security Services," draft-pastor-i2nsf-access-usecases-00, Oct. 25, 2014, 9 pages.
Lopez, E., et al., "Packet-Based Paradigm for Interfaces to NSFs," draft-lopez-i2nsf-packet-00, Mar. 22, 2015, 7 pages.
Pastor, A., et al., "Use Cases and Requirements for an Interface to Network Security Functions," draft-pastor-i2nsf-merged-use-cases-00, Jun. 26, 2015, 16 pages.
Qi, M., et al., "Integrated Security with Access Network Use Case," draft-qi-i2nsf-access-network-usecase-00, Oct. 24, 2014, 5 pages.
Xia, L., et al., "Data Model of Interface to Network Security Functions Service Interface," draft-xia-i2nsf-service-interface-dm-00.txt, Feb. 10, 2015, 14 pages.
Xie, Y., et al., "Interface to Network Security Functions Demo Outline Design," draft-xie-i2nsf-demo-outline-design-00.txt, Apr. 29, 2015, 20 pages.
Zarny, M., et al., "I2NSF Data Center Use Cases," draft-zarny-i2nsf-data-canter-use-cases-00, Oct. 25, 2014, 9 pages.
Lopez, E., et al., "Framework for Interface to Network Security Functions," draft-merged-i2nsf-framework-04.txt, Oct. 19, 2015, 23 pages.
Xia, L., et al., "Information Model of Interface to Network Security Functions Capability Interface," draft-xia-i2nsf-capability-interface-im-04.txt, Oct. 19, 2015, 23 pages.
Bradner, S., et al., "Key Words for Use in RFCs to Indicate Requirements Levels," RFC 2119, Mar. 1997, 3 pages.
Crocker, D., Ed., et al., "Augmented BNF for Syntax Specifications: ABNF," RFC 2234, Nov. 1997, 14 pages.
Moore, B., et al., "Policy Core Information Model—Version 1 Specification," RFC 3060, Feb. 2001, 100 pages.
Moore, B., Ed., "Policy Core Information Model (PCIM) Extensions," RFC 3460, Jan. 2003, 93 pages.
Farrel, A., et al., "Routing Backus-Naur Form (RBNF) : A Syntax Used to Form Encoding Rules in Various Routing Protocol Specifications," RFC 5511, Apr. 2009, 14 pages.
Bjorklund, M., Ed., et al., "YANG—A Data Modeling Language for the Network Configuration Protocol (NETCONF)," RFC 6020, Oct. 2010, 173 pages.
Boucadair, M., et al., "IP Connectivity Provisioning Profile (CPP)," RFC 7297, Jul. 2014, 22 pages.
"Series X: Data Networks, Open System Communications and Security, Telecommunication security, Framework for creation, storage, distribution and enforcement of policies for network security," ITU-T, X.1036, Nov. 2007, 50 pages.
"Network Functions Virtualisation (NFV); Use Cases," ETSI GS NFV 001, V1.1.1, Oct. 2013, 50 pages.
"Role Based Access Control," BSR INCITS 359, ITI, Apr. 4, 2003, 49 pages.
"Network Based Services in Mobile Networks Context, Typical Use Cases, Problem Area, Requirements," IETF 87 Berlin, BoF Meeting on Network Service Chaining (NSC), Jul. 29, 2013, 7 pages.
"The Pros and Cons of a Cloud-Based Firewall," Masters of Internet Infrastructure, Network World, Nov. 11, 2011, 3 pages.
Halpern, J., Ed., et al., "Service Function Chaining (SFC) Architecture," draft-ietf-sfc-architecture-05, Feb. 17, 2015, 27 pages.
Li, H., et al., "Service Function Chaining (SFC) Control Plane Architecture," draft-ww-sfc-control-plane-03, Sep. 22, 2014, 18 pages.
Foreign Communication From a Counterpart Application, PCT Application No. PCT/CN2016/074165, International Search Report dated May 20, 2016, 9 pages.
Foreign Communication From a Counterpart Application, PCT Application No. PCT/CN2016/074165, Written Opinion dated May 20, 2016, 6 pages.
Machine Translation and Abstract of Chinese Publication No. CN101374247, Feb. 25, 2009, 59 pages.
Machine Translation and Abstract of Chinese Publication No. CN101997721, Mar. 30, 2011, 16 pages.
Machine Translation and Abstract of Chinese Publication No. CN102171993, Aug. 31, 2011, 21 pages.
Foreign Communication From a Counterpart Application, Chinese Application No. 201680012084.8, Chinese Office Action dated May 20, 2019, 6 pages.
Foreign Communication From a Counterpart Application, Chinese Application No. 201680012084.8, Chinese Notice of Allowance dated Dec. 3, 2019, 4 pages.

* cited by examiner

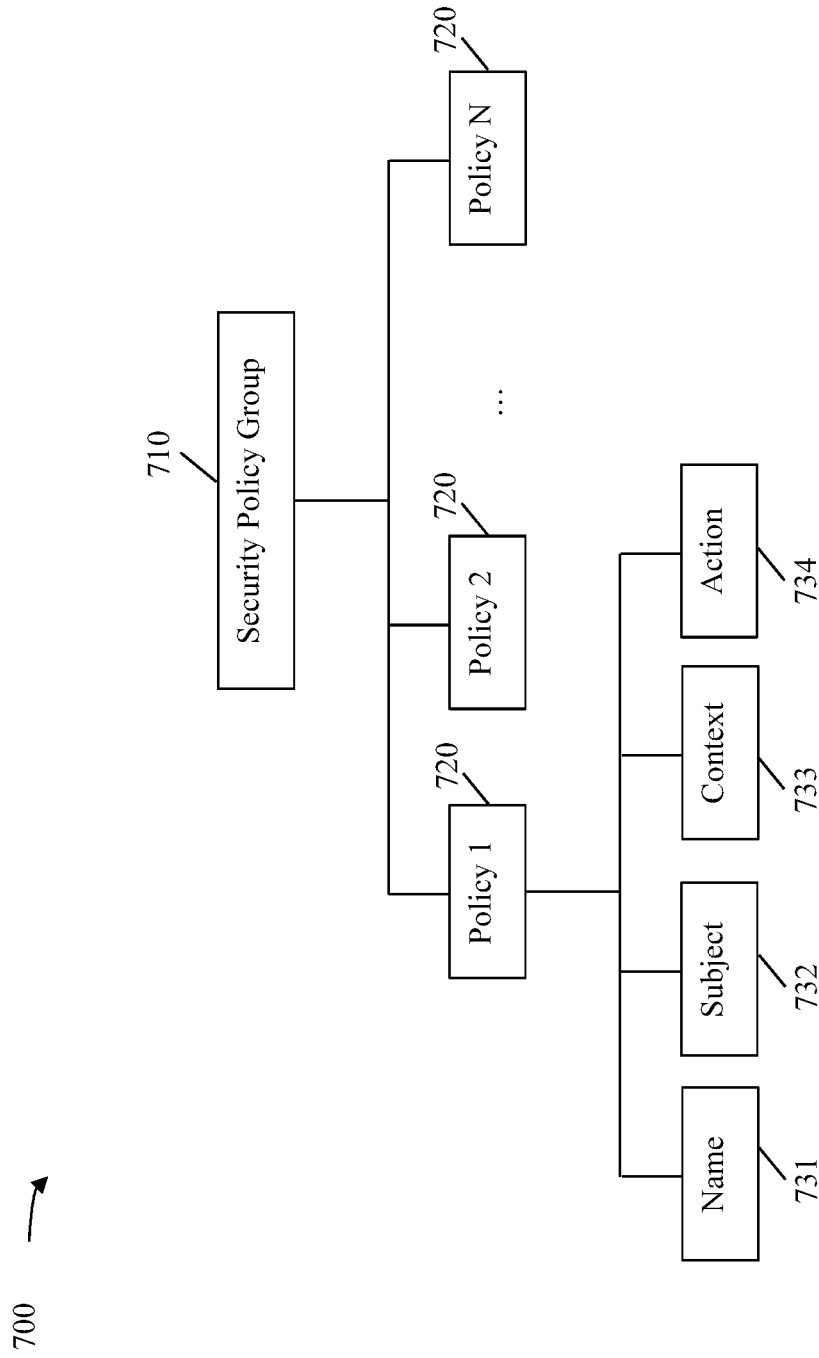

| Vendor Name | SF Name | SF Type | Policy | Action |
|---|---|---|---|---|
| X | A | FW | Layer 2/3 | Pass/Drop |
| | B | IPS | Time Span | |
| | C | IDS | Event | |
| | D | Web Filter | HTTP | Call video optimization |
| Y | | | | |

| Vendor Name | SF Name | SF Type | SF Instance Count | SF Instance Locator | Supported Service Profile |
|---|---|---|---|---|---|
| X | A | FW | 10 | Address list 1 | Profile list 1 |
| | B | IPS | 20 | Address list 2 | Profile list 2 |
| | C | IDS | 4 | Address list 3 | Profile list 3 |
| | D | Web Filter | 4 | Address list 4 | Profile list 4 |
| Y | | | | | |

SERVICE FUNCTION REGISTRATION MECHANISM AND CAPABILITY INDEXING

CROSS-REFERENCE TO RELATED APPLICATIONS

The present application claims priority to U.S. Provisional Patent Application 62/120,761 filed Feb. 25, 2015 by Linda Dunbar, et al., and entitled "Service Function Registration Mechanism," and U.S. Provisional Patent Application 62/120,765 filed Feb. 25, 2015 by Linda Dunbar, et al., and entitled "Network Service Function Capability Index and Configuring," which are incorporated by reference.

REFERENCE TO A MICROFICHE APPENDIX

Not applicable.

BACKGROUND

Network operators utilize various service functions in the delivery of services to end users. Some examples of service functions include firewalls (FWs), network address translations (NATs), server load balancers (LBs), wide area network (WAN) optimizations, and other open system interconnection (OSI) layer 4 (L4) to layer 7 (L7) services. The L4 to L7 services are commonly located at a centralized location, such as a data center (DC) gateway. In order to apply the L4 to L7 services, data-forwarding directs data traffic to traverse through the DC gateway. Thus, the DC gateway may experience a high volume of traffic.

Service chaining is a service function deployment model that leverages network functions virtualization (NFV) and software defined networking (SDN) technologies to steer data traffic of a data flow through a sequence of services according to a policy configured for the data flow instead of through a centralized location. NFV enables the migration of services from dedicated hardware to software and/or virtual machines (VMs). SDN enables the separation of control and forwarding functions and a software programmable control plane. For example, services may be implemented as software components, moved out of the centralized location, and instantiated at multiple locations in the network by employing NFV. Data flows may be steered through the service instance locations by employing the SDN model, where a network controller may configure network nodes with data-forwarding instructions.

SUMMARY

In one embodiment, the disclosure includes a method implemented in a network engine comprising receiving, by a service function (SF) orchestrator in the network engine, a registration request message from a third party SF manager requesting registration of a SF comprising one or more SF instances in a network, wherein the registration request message comprises vendor identification information identifying a vendor of the SF and SF identification information identifying the SF, receiving, by the SF orchestrator, a capability information message from the third-party SF manager indicating vendor-specific capability information associated with the SF, receiving, by the SF orchestrator, a service request message from a service client requesting a network service and one or more policies for the service, generating the network service by utilizing the one or more SF instances according to the one or more policies and the vendor-specific capability information, and sending the one or more policies to the one or more SF instances to facilitate an execution of the network service requested by the service client. In some embodiments, the disclosure also includes the vendor identification information comprises a vendor name of the vendor, and a vendor identifier (ID) identifying the vendor, and wherein the SF identification information comprises a SF name of the SF, a SF type identifying a service type of the SF, and a SF ID identifying the SF, and/or further comprising sending, by the SF orchestrator, an authentication request message to an authentication, authorization, and accounting (AAA) entity to request authentication for the vendor, and receiving, by the SF orchestrator, an authentication grant message from the AAA entity comprising an authentication grant to the vendor, and/or further comprising sending, by the SF orchestrator, a session start message to the third-party SF manager to start a session with the third-party SF manager after receiving the authentication grant message, wherein the capability information message is received after sending the session start message, and/or wherein the SF identification information comprises a SF ID identifying the SF, and wherein the session start message comprises a session ID identifying the session, a session key associated with the session, and the SF ID indicating that the SF is registered for the session, and/or further comprising receiving, by the SF orchestrator, a SF instance information message from the third-party SF manager indicating location information associated with the SF instance in the network, and storing the location information in a SF instance database (DB), and/or further comprising receiving, by the SF orchestrator, a capability update message from the third-party SF manager indicating a dynamic update of the capability information of the SF, and/or wherein the capability information message indicates a policy supported by the SF, and wherein the policy comprises a packet-level inspection depth, a contextual state, and an action supported by the SF, and/or wherein the SF is associated with network security.

In another embodiment, the disclosure includes a virtual network function (VNF) controller comprising a receiver configured to receive a first SF configuration message from a network controller indicating a first policy for a first SF instance of a SF located in a network, a processor coupled to the receiver and configured to determine that the first SF instance is one of a first plurality of SF instances of the SF in association with a first of a plurality of sub-controllers, and a transmitter coupled to the processor and configured to send a second SF configuration message to the first sub-controller instructing the first sub-controller to dispatch the first policy to the first SF instance. In some embodiments, the disclosure also includes that the first SF instance is associated with a service flow in the network, wherein the processor is further configured to obtain information indicating that the service flow is reconfigured to associate with a second SF instance of the SF instead of the first SF instance, and determine that the second SF instance is one of a second plurality of SF instances of the SF in association with a second of the plurality of sub-controllers, and wherein the transmitter is further configured to send a third SF configuration message to the second sub-controller instructing the second sub-controller to dispatch the first policy to the second SF instance, and/or wherein the receiver is further configured to receive a third SF configuration message from the network controller indicating a second policy for a second SF instance of the SF located in the network, wherein the first policy and the second policy are different, wherein the processor is further configured to determine that the second SF instance is one of a second plurality of SF instances of the SF in association with a second of the plurality of sub-controllers, and wherein the transmitter is further configured to send a fourth SF configuration message to the second sub-controller instructing the second sub-controller to dispatch the second policy to the second SF instance, and/or wherein the first SF instance is associated with a service flow in the network, and wherein the transmitter is further configured to send a SF instance location message to a SDN controller indicating location information associated with the first SF instance to enable forwarding of traffic associated with the service flow towards the first SF instance.

In yet another embodiment, the disclosure includes a method implemented in a network engine comprising receiving, by a SF orchestrator in the network engine, a capability information message from a third-party SF manager indicating a SF name of a SF in a network and vendor-specific capability information associated with the SF, indexing, by the SF orchestrator, the vendor-specific capability information in a SF catalog DB, receiving, by the SF orchestrator, a service request message from a service client requesting a service in the network and a policy for the service, determining, by the SF orchestrator, that the service is associated with the SF, generating, by the SF orchestrator, a configuration for the SF according to the policy and the indexed capability information, and sending, by the SF orchestrator, a SF configuration message to a network element (NE) to facilitate an execution of the SF according to the configuration. In some embodiments, the disclosure also includes that the capability information message comprises a supported header field indicating a packet-level inspection depth supported by the SF, a supported context field indicating a contextual state maintained by the SF, a supported action field indicating an action supported by the SF, and a supported function field indicating a function supported by the SF in addition to functionalities of the SF, and/or wherein the packet-level inspection depth is associated with an SC encapsulation protocol, a media access control (MAC) protocol, an Internet protocol version 4 (IPv4) protocol, an Internet protocol version 6 (IPv6) protocol, a transmission control protocol (TCP), an user datagram protocol (UDP), a hypertext transfer protocol (HTTP), or combinations thereof, and/or wherein the contextual state is associated with time, a traffic flow direction, an authentication state, an authorization state, an accounting state, a session state, or combinations thereof, and/or wherein the action is associated with a network security comprising an antivirus (AV) operation, an intrusion protection system (IPS) operation, an uniform resource locator (URL) filtering operation, a file blocking operation, a data filtering operation, an application control operation, or combinations thereof, and/or wherein indexing the vendor-specific capability information comprises indexing the SF name under a name category in the SF catalog DB, indexing the supported header field under a subject category in the SF catalog DB, indexing the supported context field under a context category in the SF catalog DB, indexing the supported action field under an action category in the SF catalog DB, and indexing the supported action field under a function category in the SF catalog DB, and/or wherein generating the configuration for the SF comprises generating a policy condition according to the supported header field and the supported context field in the capability information message and the policy in the service request message, generating a policy action according to the supported action field and supported function field in the context field in the capability information message and the policy in the service request message, and generating a policy rule according to the policy condition and the policy action and the policy in the service request message.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 7 is a schematic diagram of an embodiment of a capability interface model.

DETAILED DESCRIPTION

Figure 1:
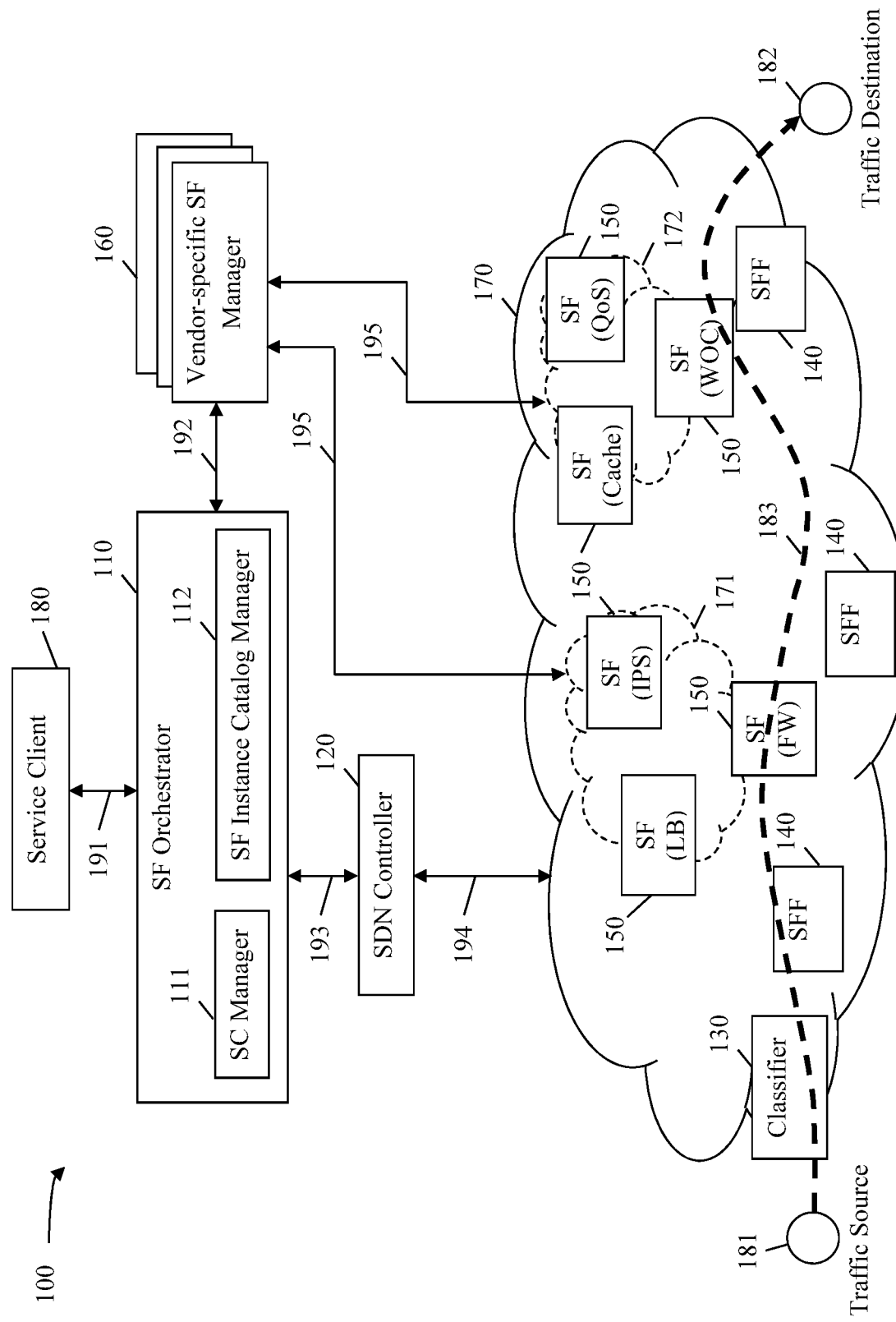
FIG. 1 is a schematic diagram of an embodiment of a service chain (SC)-enabled network system.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

NFV is a network architecture that virtualizes network node functions into building blocks that may be connected or chained together to create network services. A VNF comprises one or more software components or software processes executed by one or more VMs on servers, switches, storages, and/or cloud computing infrastructure, instead of provided by a custom or dedicated hardware appliance. In an NFV environment, a VNF may be instantiated at multiple locations, moved, or deleted to meet changes in service demands.

SC is a flexible network model that is built on top of an NFV infrastructure. In an SC-enabled network, SFs and SF instances are implemented as VNFs and traffic flows are steered through SFs or SF instances as defined by policies. A SF may be instantiated at multiple locations in a network. For example, a network address translation (NAT) type-44 (NAT44) SF comprises two different SF instantiations, one that applies a policy A (e.g., NAT44-A) and another that applies a policy B (e.g., NAT44-B). In addition, different SF instantiations may comprise different capabilities. For example, one NAT44-A instance supports a data throughput of about 10 gigabits per second (Gbps), while another NAT44-A instance supports a data throughput of about 100 Gbps. Thus, in order to support SC, path computation engines are extended to consider topologies and capabilities of the SFs in addition to network resources, such as link capacities, and forwarding nodes are extended to forward data flows to corresponding SFs.

The employment of NFV enables the utilization of SFs from various third-parties. However, SFs from different third-parties and vendors may comprise different capabilities and configurability requirements. For example, a FW from a vendor A may be stateful, whereas a FW from a vendor B may require bidirectional congruency. Thus, the orchestration of vendor-specific SFs may be complex.

Disclosed herein are various embodiments for registering and orchestrating vendor-specific SFs in an SC-enabled network by providing a SF registration protocol, a capability interface model, and a policy information model. The registration protocol provides common mechanisms for different vendors to register vendor-specific SFs in an SC-enabled network so that a SF orchestrator may utilize the vendor-specific SFs to construct SCs. The registration protocol includes registration of SFs, capabilities of the SF, and locations of the instances of the SF. The capability interface model classifies SF capabilities and SF configurability. For example, the vendors employ the capability interface model to indicate SF capabilities, and the SF orchestrator employs the capability model to index the SF capabilities. Flow-based SFs commonly perform actions based on rule-based matching conditions. Thus, the capability interface model is defined in a similar condition-action-based format. In an embodiment, the capability interface model categorizes SF capabilities into a name category, a subject category, a context category, and an action category. The name category is associated with names of the policy rules. The subject category is associated with packet level inspection depth, which may be at a header level or a payload level. The context category is associated with contextual states, such as time, events, and session states, maintained by the SFs. The action category is associated with actions supported by the SFs. The actions may include basic actions, such as packet drop, pass, and report, advanced actions, for example, based on security profiles, signature files, and statistical models. The policy information model provides a set of common configuration rules for the SF orchestrator to configure SFs. For example, a service client requests a service in the SC-enabled network and specifies a policy for the service. The policy information model comprises policy rules formed from policy conditions and policy actions. The policy conditions comprise target groups and policy context corresponding to the subject category and the context category of the capability interface model, respectively. The disclosed embodiments further provide a VNF controller hierarchical architecture for controlling and managing SFs and SF instances in an SC-enabled network. For example, a main VNF controller controls a plurality of sub-controllers, each controlling a cluster of SF instances of a particular SF. Different clusters of SF instances may perform different portions of the SF or comprise different capabilities. The disclosed embodiments are applicable to network security relation functions, flow-based SFs, proxy-based SFs, and/or any type of network services.

FIG. 1 is a schematic diagram of an embodiment of an SC-enabled network system 100. The system 100 comprises a SF orchestrator 110, an SDN controller 120, and a network 170. The SF orchestrator 110 is in data communication with the SDN controller 120 via an orchestrator-controller interface 193. The SDN controller 120 is in data communication with the network 170 via a controller-network interface 194. The network 170 is a service overlay network. The underlying physical network of the network 170 may be any type of transport network, such as an electrical network and/or an optical network, and may comprise one or more network domains. The network 170 may employ any transport protocols, such as an Internet Protocol (IP)/User Datagram Protocol (UDP), suitable for transporting data over the underlying physical network of the network 170. The network 170 may employ any type of network virtualization and/or network overlay technologies, such as a virtual extensible local area network (VXLAN). In an embodiment, the network 170 is an SDN-enabled network, where network control is decoupled from forwarding and the control plane is programmable through software controlled by a central management entity, such as the SDN controller 120. The network 170 comprises a classifier 130, a plurality of SF forwarders (SFFs) 140, and a plurality of SFs 150.

The SFs 150 are logical entities or software components executed or hosted on service nodes (SNs), which may be VMs, servers, and/or any computing devices and systems. The SFs 150 may include any type of network functions, such as a FW service, an intruder prevention system (IPS) service, an LB service, a cache service, a quality of service (QoS) service, and a wide area network optimization controller (WOC) service. In some embodiments, the SFs 150 may be located in different sub-domains or sub-networks 171 in the network 170. For example, the SFs 150 for FW, IPS, and LB are located in one sub-network 171 and the SFs 150 for cache, QoS, and WOC are located in another sub-network 172. Each SF 150 comprises a pool of instances of the SF 150, which may be provided by one or more vendors. For example, the FW SF 150 may comprise a first set of FW instances of a vendor A and a second set of FW instances of a vendor B. Since different vendors may provide SFs 150 with different capabilities and configurability requirements, vendors may employ third-party vendor-specific SF managers 160 to manage their own SF instances in the network 170 via vendor management interfaces 195. The vendor-specific SF managers 160 are logical entities, which may include VMs, servers, and any computing systems, deployed by corresponding vendors or third parties.

The SF orchestrator 110 may be a VM, a dedicated host, a distributed system comprising a plurality of computing devices, or any other device and/or system configured to create and manage SCs and/or a service overlay topology in the network 170. The SF orchestrator 110 is an administrative entity or a management entity that operates in an SC-enabled domain, such as the network 170. An SC-enabled domain refers to a network domain that deploys SFs such as the SFs 150 and instances of the SFs. The SF orchestrator 110 comprises an SC manager 111 and a SF instance catalog manager 112. The SF instance catalog manager 112 communicates with the vendor-specific SF managers 160 via a SF registration interface 192 to register the SFs 150 and to obtain information associated with the SFs 150, as described more fully below. The SC manager 111 generates SCs in the network 170 to serve a service client 180. The service client 180 may be a user, an application, or an operator's operations support system (OOS) and management system. For example, the service client 180 sends a service request to the SF orchestrator 110 via a client interface 191 to request a flow between a traffic source 181 and a traffic destination 182 and specifies a policy for the flow. The SC manager 111 analyzes the service request, selects a set of SFs 150 (e.g., a FW and a WOC) to satisfy the policy, and generates an SC or a SF set according to the selected SFs 150. The SC manager 111 determines classification policy and coordinates with the SF instance catalog manager 112 to determine forwarding policy for the SC. The classification policy may include classification rules or flow criteria (e.g., an IP address) for binding data traffic to the SC, services associated with the SC and/or metadata associated with the SC or the SF set. The forwarding policy may include mappings between the SFs 150 and locations of the SFs 150. The SF orchestrator 110 sends the classification policy and the forwarding policy to the SDN controller 120 to request the SDN controller 120 to establish a service flow in the network 170 according to the classification policy and the forwarding policy. It should be noted that SFs in an SC are ordered, whereas SFs in a SF set may not be ordered and may collectively perform a particular service.

The SDN controller 120 may be a VM, a dedicated host, a distributed system comprising a plurality of computing devices, or any other device and/or system configured to manage the network 170. The SDN controller 120 performs SDN management and/or control operations. For example, the SDN controller 120 determines forwarding paths in the network 170 and configures network nodes, such as the classifier 130, the SFFs 140, and SNs that implement the SFs 150, with the forwarding instructions via a controller-network interface 194. In addition, the SDN controller 120 coordinates with the SF orchestrator 110 to facilitate the implementations of SCs by establishing service flows in the network 170. It should be noted that an SC is a sequence order of SFs and a service flow is an SC instantiation that traverses instances of the SFs. The SDN controller 120 establishes a service flow by sending classification policy to the classifier 130 and forwarding policy and/or metadata to the SFFs 140 as instructed by the SF orchestrator 110. For example, the SDN controller 120 establishes a service flow 183 between the traffic source 181 and the traffic destination 182, traversing an instance of the FW SF 150 and an instance of the WOC SF 150. Further, the SDN controller 120 configures rules for the SFs 150, as discussed more fully below. It should be noted that, in some embodiments, the SF orchestrator 110 may be implemented within the SDN controller 120.

The classifier 130 may be a VM, a dedicated host, a network node, such as a router and/or a switch, or any other device configured to perform classification. For example, a classifier 130 may be a component within an SC ingress node, which is an SC boundary node that handles traffic entering an SC-enabled domain or an SC proxy node in the SC enabled-domain. For example, the traffic flow from the traffic source 181 enters the SC-enabled domain via the classifier 130. When the classifier 130 receives a data packet from the traffic source 181, the classifier 130 identifies an SC and a service flow or a SF path for the data packet. The classifier 130 may perform classification at various granularities, which may be relatively coarse (e.g., at a port level) or quite granular (e.g., matching packet header fields to classification rules received from the SDN controller 120). In order to direct the data packet along the identified SF path, the classifier 130 generates an SC packet to carry both the incoming data packet and the SF path information, for example, by encapsulating the data packet with a network service header (NSH) indicating the SF path information. The classifier 130 sends the SC packet to a next SFF 140 in the identified service flow. It should be noted that the classifier 130 may perform additional encapsulations over the SC packet, for example, according to a transport protocol and/or a network overlay (e.g., IP/UDP, VXLAN) in use.

The SFFs 140 are any network nodes or devices, such as routers, switches, and/or or bridges, configured to forward packets and/or frames received from the network 170 to one or more SFs 150 associated with the SFFs 140 according to information carried in the SC encapsulations. When a SFF 140 receives a packet carrying an SC packet from the network 170, the SFF 140 performs decapsulation (e.g., removal of transport header) to obtain the SC packet. The SFF 140 determines the appropriate SFs 150 for processing the packet and forwards the SC packet to the corresponding SFs 150, as discussed more fully below. For example, one SFF 140 steers a traffic flow through the FW SF 150 and another SFF 140 steers the traffic flow through the WOC SF 150. Alternatively, a single SFF 140 steers the traffic flow through both the FW SF 150 and the WOC SF 150. After the packet is processed by the SFs 150, the SFF 140 may forward the processed packet to another SFF 140. When the processed packet reaches a last SFF 140 in the SF path, the SFF 140 delivers the data processed by a last SF 150 to the traffic destination 182. It should be noted that although traffic flows or service flows are steered through the SFs 150, the SFs 150 may be NSH-aware or NSH-unaware.

The client interface 191, the SF registration interface 192, the orchestrator-controller interface 193, the controller-network interface 194, and the vendor management interface 195 may be implemented by exchanging messages comprising standardized formats or employing standardized application programming interfaces (APIs). The communication mechanisms of the interfaces 191-195 may be independent of each other. For example, the controller-network interface 194 may employ an OpenFlow protocol and the vendor management interface 195 may be defined by vendors. The interface mechanisms and models for the client interface 191, the SF registration interface 192, and the orchestrator-controller interface 193 are described more fully below. The system 100 may be configured as shown or alternatively configured by a person of ordinary skill in the art to achieve similar functionalities.

Figure 2:
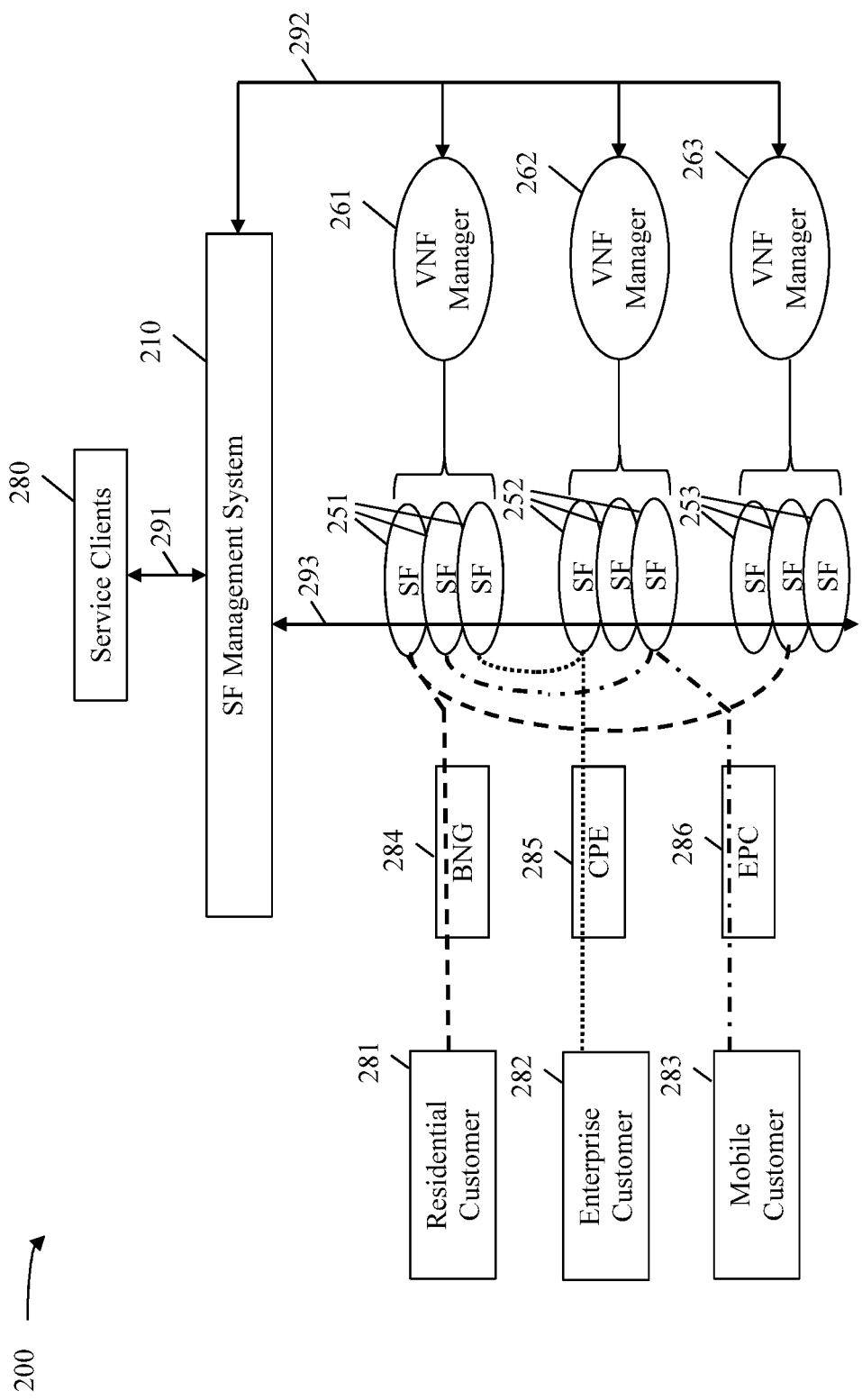
FIG. 2 is a schematic diagram of another embodiment of an SC network system.

FIG. 2 is a schematic diagram of another embodiment of an SC-enabled network system 200. The system 200 is similar to the system 100 and provides a more detailed view of the management architecture of the system 100. The system 200 comprises a SF management system 210. The SF management system 210 may include a SF orchestrator, such as the SF orchestrator 110, and a network controller, such as the SDN controller 120. The SF management system 210 communicates with service clients 280, VNF managers 261-263, and SFs 251-253 via a client interface 291, a vendor interface 292, and a VNF interface 293, respectively. The service clients 280 are similar to the service client 180 and the client interface 291 is similar to the client interface 191. The VNF managers 261-263 are similar to the vendor-specific SF instance mangers 160. The vendor interface 292 is similar to the SF registration interface 192. The SFs 251-253 are similar to the SFs 150. The VNF interface 293 is similar to the interface between the SF orchestrator 110 and the SFs 150 including both the orchestrator-controller interface 193 and the controller-network interface 194. As shown, the VNF manager 261 manages the SFs 251, the VNF manager 262 manages the SFs 252, and the VNF manager 263 manages the SFs 253. The SFs 251-253 may be provided by different vendors. For example, a vendor A provides the SFs 251 and the VNF manager 261, a vendor B provides the SFs 252 and the VNF manager 262, and a vendor C provides the SFs 253 and the VNF manager 263.

The vendor interface 292 enables the VNF managers 261-263 to register the SFs 251-253 with the SF management system 210. To register the SFs 251-253, the SF management system 210 authenticates the vendors. After completing authentication, the VNF managers 261-263 send SF information associated with the SFs 251-253, such as SF types, instance locations, capabilities, and configurability requirements, to the SF management system 210. Upon receiving the SF information, the SF management system 210 stores the SF information in a SF catalog DB. The SF management system 210 employs a common registration protocol across the vendor interface 292 to communicate with all VNF managers 261-263 and a common indexing model to store and index the SF information, as described more fully below.

The client interface 291 enables the service clients 280 to dynamically set policies and/or profiles to the SFs 251-253 and monitor the performance and execution statuses of flows of the service clients 280. The client interface 291 may leverage existing protocols, such as protocols defined in representational state transfer configuration (RESTconf), network configuration (Netconf), authentication, authorization, and accounting (AAA), and security automation and continuous monitoring (SACM) to carry security policies that can be expressed by discretionary access control, mandatory access control, role-based access control, attribute-based access control, policy-based access control, or combinations thereof. The service clients 280 may specify various policies and/or profiles to configure permissions for Internet traffic and/or web sites access. Some examples of policies and/or profiles may include, but are not limited to, enabling basic parental control, enabling school protection control, allowing Internet traffic during a predetermined time interval, scanning email for malware detection, protecting traffic for corporate networks with integrity and confidentiality, and removing tracking data from social networking websites.

The VNF interface 293 enables the SF management system 210 to dynamically configure the SFs 251-253 with service layer policies. When the SF management system 210 receives policies and profiles, which may be abstract and service-oriented, from the service clients 280, the SF management system 210 maps the received polices and profiles into suitable or implementable functional formats for configuring the SFs 251-253. The formats are defined according to a standardized information model and/or data model, as described more fully below.

As an example, a first service client 280 requests a first service for a residential customer 281, a second service client 280 requests a second service for an enterprise customer 282, and a third service client 280 requests a third service for a mobile customer 283. The SF management system 210 analyzes each request and selects SFs from the SF catalog DB to satisfy each request. The SF management system 210 generates configurations for the selected SFs 251-253 and configures the SFs 251-253 accordingly. As shown, the SF management system 210 establishes a first service flow for the residential customer 281, traversing a broadband network gateway (BNG) 284, a SF 251, and a SF 253 as shown by the dashed line. The BNG 284 is an access point for subscribers to connect to a broadband network. The SF management system 210 establishes a second service flow for the enterprise customer 282, traversing a customer premise equipment (CPE) 285, a SF 252, and a SF 251 as shown by the dotted line. The CPE 285 is a terminal and associated equipment located at a subscriber's premises. The SF management system 210 establishes a third service flow for the mobile customer 283, traversing an evolved packet core (EPC) 286, a SF 252, and a SF 251 as shown by the dashed-dotted line. The EPC 286 is a network that provides converged voice and data networking.

Figure 3:
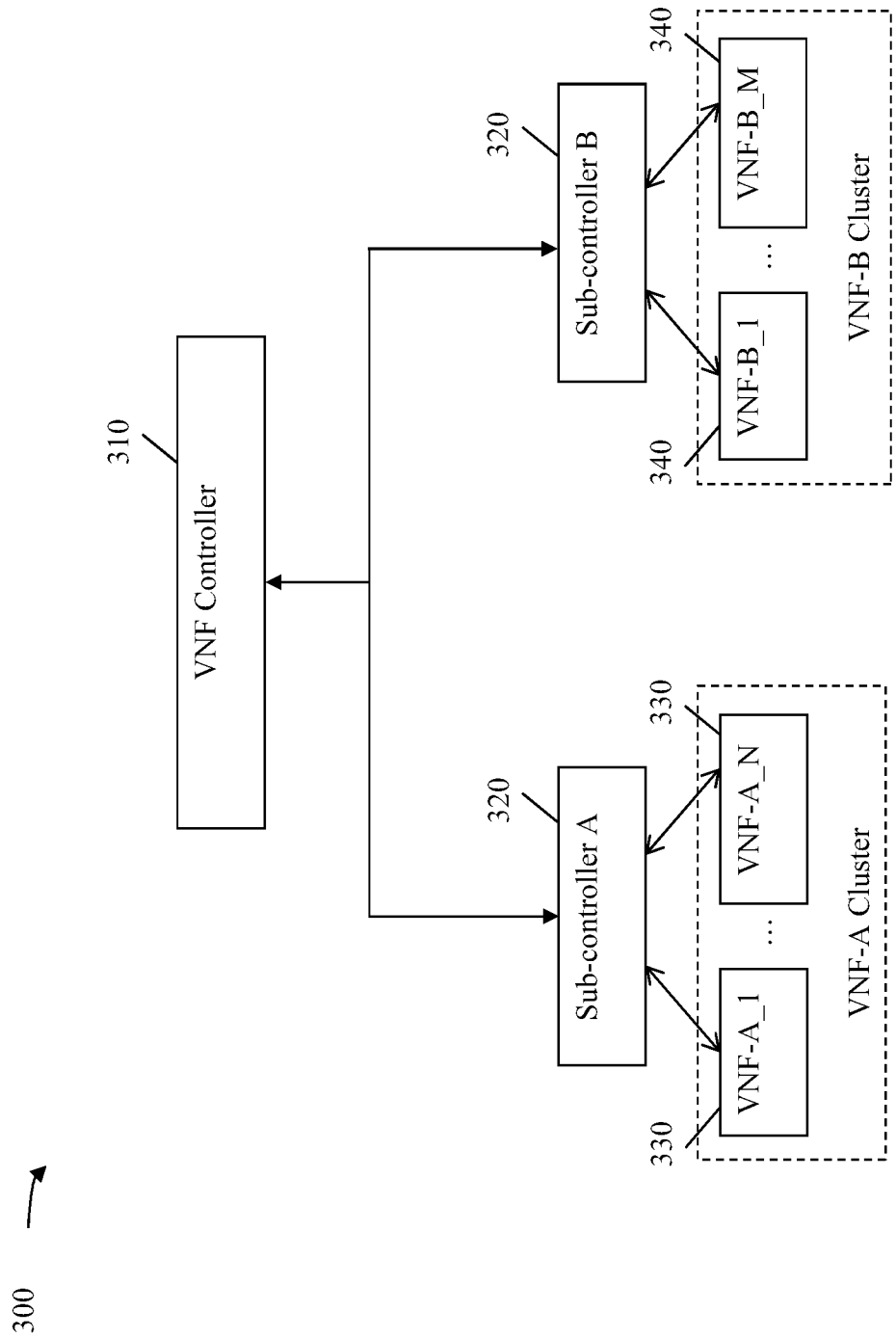
FIG. 3 is a schematic diagram of an embodiment of a hierarchical virtual network function (VNF) controller system.

FIG. 3 is a schematic diagram of an embodiment of a hierarchical VNF controller system 300. The system 300 is employed by NFV-enabled, flow-based networks, such as the systems 100 and 200, to manage VNFs 330 and 340, such as the SFs 150 and 251-253. The system 300 comprises a VNF controller 310 and a plurality of sub-controllers 320, shown as sub-controller A and sub-controller B. The VNF controller 310 and the sub-controllers 320 may be VMs, dedicated hosts, distributed systems comprising a plurality of computing devices, or any other device and/or system configured to manage the VNFs 330 and 340. The VNF controller 310 functions as a main controller for a particular type of SF. For example, the particular type of SF is FW and the VNFs 330 and 340 are FW instances. Alternatively, the particular type of SF is WOC and the VNFs 330 and 340 are WOC instances. The VNF controller 310 communicates with a network controller, such as the SDN controller 120, to obtain SF configurations, such as policies, profiles, and rules. The VNF controller 310 manages the sub-controllers 320 and forwards the SF configurations to the sub-controllers 320. The sub-controllers 320 manage the VNFs 330 and 340. The interactions between the system 300 and the SDN controller 120 are described more fully below.

As described above, a single SF may comprise multiple instantiations distributed across a network. In the system 300, each sub-controller 320 manages and controls a subset or a cluster of the instantiations. As shown, the sub-controller A 320 manages and controls a cluster of VNFs 330, shown as VNF-A_1 to VNF-A_N, and the sub-controller B 320 manages and controls another cluster of VNFs 340, shown as VNF-B_1 to VNF-B_M. The sub-controller A 320 presents the cluster of VNFs 330 as one entity to the VNF controller 310. The sub-controller B 320 presents the cluster of VNFs 340 as another entity to the VNF controller 310. In one embodiment, the VNF controller 310 may send a policy A to the sub-controller A 320 and a policy B to the sub-controller B. The sub-controller A 320 distributes the policy A to the VNFs 330, and the sub-controller B 320 distributes the policy B to the VNFs 340. In another embodiment, VNFs 330 may serve a first plurality of client flows and the VNFs 340 may serve a second plurality of client flows. In such an embodiment, policies to one VNF cluster, such as the cluster of VNFs 330 and the cluster of VNFs 340, may be moved and/or copied to another VNF cluster when the client flows are moved from one VNF to another VNF. In some other embodiments, the VNFs 330 and 340 each perform a different portion of a particular SF. The VNFs 330 and 340 may be hosted on the same physical platform or different physical platforms.

In addition to distributing policies, the system 300 facilitates steering of service flows through the VNFs 330 and 340. For example, the VNF controller 310 provides the locations and addresses of the VNFs 330 and 340 to the SDN controller to enable the SDN controller to configure addresses of the VNFs 330 and 340 at SFFs, such as the SFFs 140. Thus, the SFFs may directly forward traffic flows to corresponding VNFs 330 and 340 instead of forwarding the traffic flows to the corresponding VNFs 330 and 340 through the VNF controller 310 and the sub-controllers 320.

Figure 4:
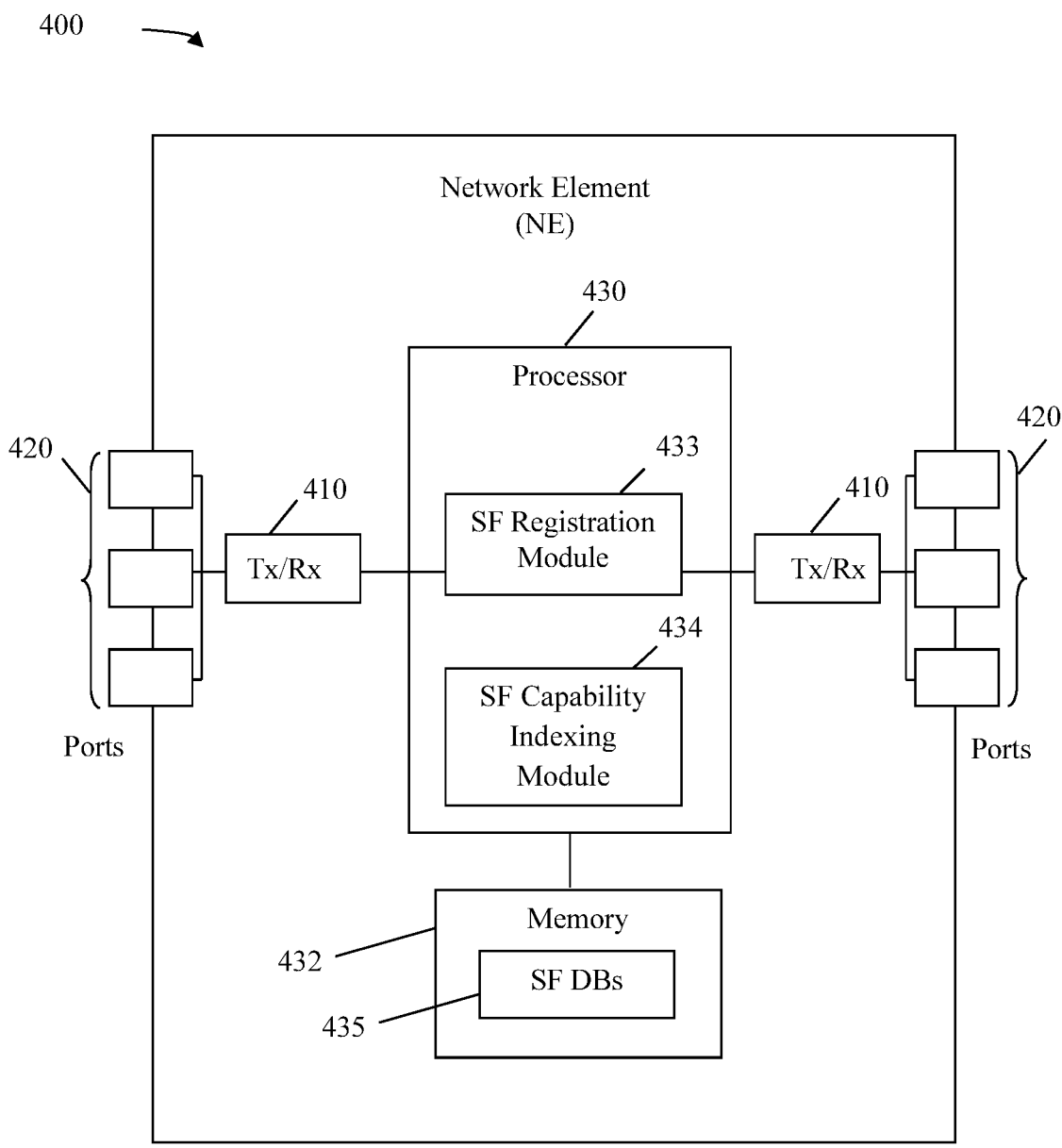
FIG. 4 is a schematic diagram of an embodiment of a network element (NE).

FIG. 4 is a schematic diagram of an embodiment of an NE 400, such as the SF orchestrator 110, the SDN controller 120, the classifier 130, the SFFs 140, the SNs that host the SFs 150, the vendor-specific SF manager 160, the service client 180, the traffic source 181, the traffic destination 182, the VNF controller 310, and the sub-controllers 320 in an SC-enabled system, such as the systems 100 and 200. NE 400 is also referred to as a network engine. NE 400 may be configured to implement and/or support the SF registration and capability indexing mechanisms and schemes described herein. NE 400 may be implemented in a single node or the functionality of NE 400 may be implemented in a plurality of nodes. One skilled in the art will recognize that the term NE encompasses a broad range of devices of which NE 400 is merely an example. NE 400 is included for purposes of clarity of discussion, but is in no way meant to limit the application of the present disclosure to a particular NE embodiment or class of NE embodiments.

At least some of the features/methods described in the disclosure are implemented in a network apparatus or component, such as an NE 400. For instance, the features/methods in the disclosure may be implemented using hardware, firmware, and/or software installed to run on hardware. The NE 400 is any device that transports packets through a network, e.g., a switch, router, bridge, server, a client, etc. As shown in FIG. 4, the NE 400 comprises transceivers (Tx/Rx) 410, which may be transmitters, receivers, or combinations thereof. The Tx/Rx 410 is coupled to a plurality of ports 420 for transmitting and/or receiving frames from other nodes.

A processor 430 is coupled to each Tx/Rx 410 to process the frames and/or determine which nodes to send the frames to. The processor 430 may comprise one or more multi-core processors and/or memory devices 432, which may function as data stores, buffers, etc. The processor 430 may be implemented as a general processor or may be part of one or more application specific integrated circuits (ASICs) and/or digital signal processors (DSPs). The processor 430 may comprise a SF registration module 433 and a SF capability indexing module 434, which may perform SF registration and SF capability indexing, respectively, and may implement methods 500, 600, 1100, 1200, 1300, 1400, 1500, and 1600, as discussed more fully below, and/or any other flowcharts, schemes, and methods discussed herein. As such, the inclusion of the SF registration module 433 and the SF capability indexing module 434 and associated methods and systems provide improvements to the functionality of the NE 400. Further, the SF registration module 433 and the SF capability indexing module 434 effect a transformation of a particular article (e.g., the network) to a different state. In an alternative embodiment, the SF registration module 433 and the SF capability indexing module 434 may be implemented as instructions stored in the memory device 432, which may be executed by the processor 430. The memory device 432 may comprise a cache for temporarily storing content, e.g., a random-access memory (RAM). Additionally, the memory device 432 may comprise a long-term storage for storing content relatively longer, e.g., a read-only memory (ROM). For instance, the cache and the long-term storage may include dynamic RAMs (DRAMs), solid-state drives (SSDs), hard disks, or combinations thereof. The memory device 432 may be configured to store SF associated information in one or more SF DBs 435.

It is understood that by programming and/or loading executable instructions onto the NE 400, at least one of the processor 430 and/or memory device 432 are changed, transforming the NE 400 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable and that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions (e.g., a computer program product stored in a non-transitory medium/memory) may be viewed as a particular machine or apparatus.

Figure 5:
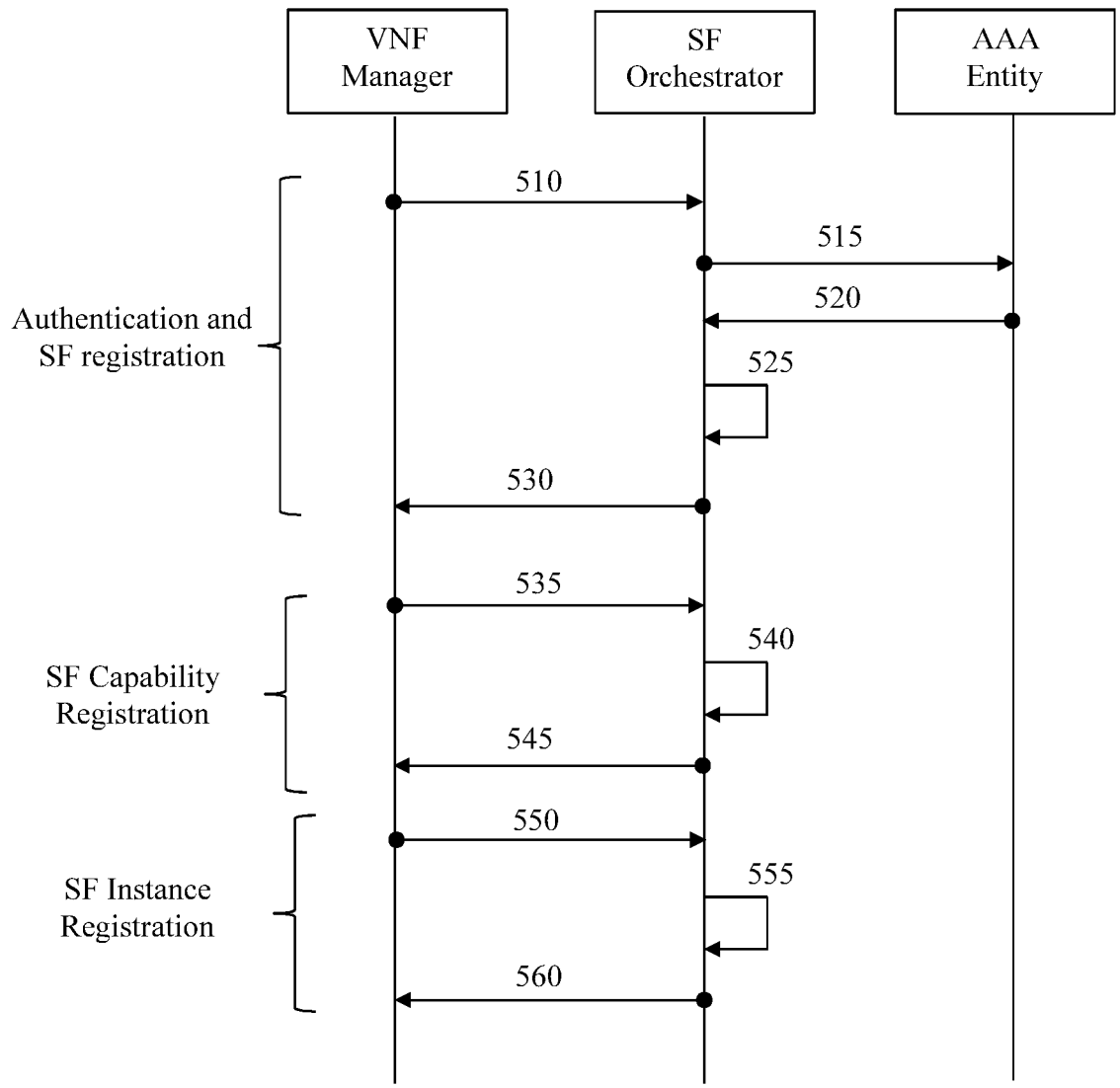
FIG. 5 is a protocol diagram of an embodiment of a service function (SF) registration method.

FIG. 5 is a protocol diagram of an embodiment of a SF registration method 500. The method 500 is employed by an SC-enabled network, such as the systems 100 and 200. The method 500 is implemented between a VNF manager, such as the vendor-specific SF manager 160 and the VNF managers 261-263, a SF orchestrator, such as the SF orchestrator 110 and the SF management system 210, and an AAA entity. The AAA entity may comprise one or more servers and computing systems configured to handle user requests for network access and provides AAA services. The AAA entity may interact with gateway servers with databases and directories comprising user information. The interface between the VNF manager and the SF orchestrator corresponds to the SF registration interface 192 and the vendor interface 292. The method 500 automates the SF registration process. The method 500 is implemented when a VNF manager deploys a SF, such as the SFs 150 and 251-253 and the VNFs 330 and 340, and instances of the SF in an SC-enabled network. The method 500 is divided into an authentication and SF registration phase, a SF capability registration phase, and a SF instance registration phase.

In the authentication and SF registration phase, at step 510, the VNF manager sends a SF registration request message to the SF orchestrator to request registration of a SF. The SF registration request message may indicate a vendor that provides the SF and basic SF information, such as a SF type of the SF. At step 515, upon receiving the SF registration request message, the SF orchestrator sends an authentication request message to the AAA entity to authenticate the vendor. At step 520, after successfully authenticating the vendor, the AAA entity sends an authentication grant message to the SF orchestrator granting access to the vendor. At step 525, the SF orchestrator stores the basic SF information in a SF catalog DB, such as the SF DBs 435. At step 530, the SF orchestrator sends a session start message to the VNF manger to start a session for utilizing the SF.

In the SF capability registration phase, at step 535, the VNF manager sends a capability information message to the SF orchestrator indicating capabilities of the SF. The capabilities include packet-level inspection or processing capabilities of the SF, contextual states maintained by the SF, and actions applied by the SF, and other additional functions supported by the SF. Packet-level processing may be at packet-header levels, such as media access control (MAC) headers, Internet protocol version 4 (IPv4) headers, Internet protocol version 6 (IPv6) headers, transport control protocol (TCP) headers, and user datagram protocol (UDP) headers. Contextual states may include time, events, protocol states, processing states, and session states. Actions may include filtering, passing, and dropping packets, invoking signature files for statistical models, and monitoring execution statuses. At step 540, upon receiving the capability information message, the SF orchestrator stores and indexes the SF's capabilities in the SF catalog DB. At step 545, the SF orchestrator sends a capability response to the VNF manager to acknowledge the reception of the capability information message.

In the SF instance registration phase, at step 550, the VNF manager sends a SF instance information message to the SF orchestrator indicating SF instance information associated with the SF. For example, the SF instance information may indicate the locations (e.g., addresses) of the SF instances in the network. At step 555, upon receiving the SF instance registration message, the SF orchestrator stores and indexes the SF instance information in the SF catalog DB. At step 560, the SF orchestrator sends a SF instance registration response message to the VNF manager to indicate that the SF instances are registered. The method 500 may also be employed to register multiple SFs. For example, the registration request message may include basic information of a list of SFs. The capabilities and the SF instances of each SF may be exchanged by employing similar mechanisms as in the steps 535-560. The formats of the SF registration request message, the session start message, the capability information message, and the SF instance information message are described more fully below.

Figure 6:
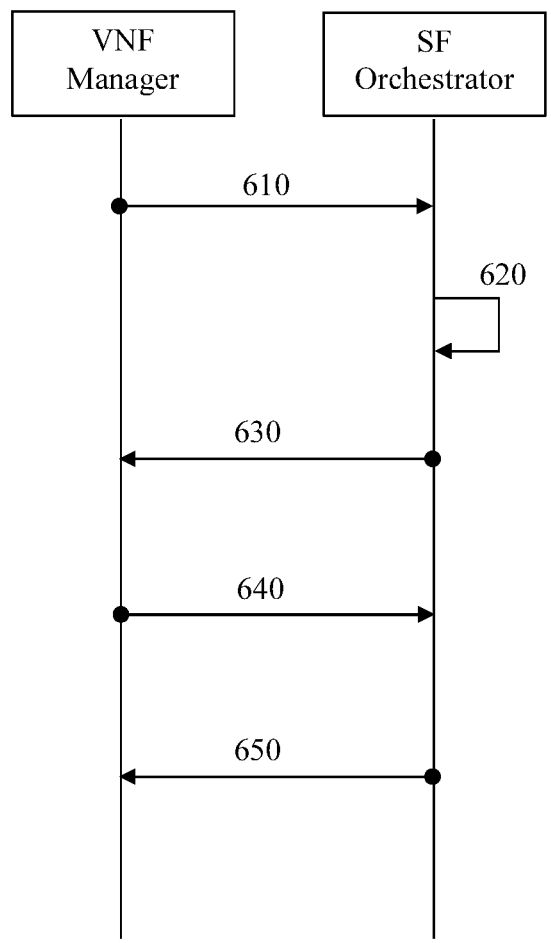
FIG. 6 is a protocol diagram of an embodiment of a SF capability update method.

FIG. 6 is a protocol diagram of an embodiment of a SF capability update method 600. The method 600 is employed by an SC-enabled network, such as the systems 100 and 200. The method 600 is implemented between a VNF manager, such as the vendor-specific SF manager 160 and the VNF managers 261-263, and a SF orchestrator, such as the SF orchestrator 110 and the SF management system 210. The method 600 is implemented after registering a SF, such as the SFs 150 and 251-253 and VNFs 330 and 340 by employing the method 500. For example, capabilities of the SF are stored in a SF catalog DB, such as the SF DBs 435. At step 610, the VNF manager sends a capability update message to the SF orchestrator indicating a dynamic capability update for the SF. The capability update message may comprise a similar format as the capability information message. At step 620, the SF orchestrator updates the SF catalog DB according to the capability update. At step 630, the SF orchestrator sends a capability update response message to the VNF manager to acknowledge the reception of the capability update message. The SF orchestrator and the VNF manager may also exchange keep alive messages at some time intervals to indicate the connection status between the VNF manager and the SF orchestrator, for example, across the SF registration interface 192 and the vendor interface 292. As shown, at step 640, the VNF manager sends a keep alive message to the SF orchestrator. At step 650, the SF orchestrator sends a keep alive response message to the VNF manager. Alternatively, the SF orchestrator may send a keep alive message to the VNF manager, and the VNF manager may respond with a keep alive response message.

FIG. 7 is a schematic diagram of an embodiment of a capability interface model 700. The model 700 is employed across the SF registration interface 192 and the vendor interface 292. The model 700 provides common mechanisms for vendor-specific VNF managers, such as the vendor-specific SF manager 160 and the VNF managers 261-263, to characterize and indicate capabilities of SFs, such as the SFs 150 and 251-253 and the VNFs 330 and 340, to a SF orchestrator, such as the SF orchestrator 110 and the SF management system 210, as described in IETF draft documents draft-merged-i2nsf-franework-04.txt and draft-xia-i2nsf-capability-interface-im-04.txt, which are incorporated by reference. Many flow-based SFs, such as FW, intrusion detection system (IDS), operate based on packet headers and/or payloads. For example, a FW analyzes packet headers and enforces policy-based on a protocol type, a source address, a destination address, a source port, a destination port, and/or other packet header attributes. The FW rejects packets that do not match the policy. The FW may optionally perform additional functions, such as logging and sending notifications to a system administrator. An IDS analyzes whole packets, both headers and payloads, looking for known events. When the IDS detects a known event, the IDS generates a log message detailing the event. The IDS may optionally perform additional functions, such as sending notifications to a system administrator. An IPS analyzes whole packets, both headers and payloads, looking for known events. When the IPS detects a known event, the IPS rejects the packet. The IPS may optionally perform additional functions, such as sending notifications to a system administrator. As such, flow-based SFs operate as packet-processing engines that inspect packets traversing networks, either directly or in the context of sessions associated with the packets. Thus, SF capabilities may be characterized by the depth of packet-level inspection, context, actions, and optional functions.

As shown, the model 700 comprises a security policy group 710 comprising a plurality of policies 720 that may be applied to a particular SF. Each policy 720 comprises a name category 731, a subject category 732, a context category 733, and an action category 734. The name category 731 indicates a name and a type of the policy 720.

The subject category 732 indicates packet-level inspection capabilities of the SF. The subject category 732 may indicate whether the SF may be configured to differentiate network segments, network zones, and packet fields for processing. For example, a network, such as the network 170, may be defined into multiple zones or segments for administrative and security purposes. Some examples of packet fields may include, but are not limited to, OSI layer 2 or MAC header fields, OSI layer 3 header fields, IPv4 header fields, IPv6 header fields, TCP/stream control transmission protocol (SCTP)/datagram congestion control protocol (DCCP) packet fields, UDP packet fields, hypertext transfer protocol (HTTP) layer fields, Internet engineering task force (IETF) port control protocol (PCP) fields, and IETF traversal using relays and NAT (TURN) revised and modernized (TRAM) fields.

The context category 733 indicates context or object matching capabilities of the SF, which may include, but are not limited to, an subscriber identifier (ID), an application ID, a service ID, a timer ID, an event ID, and a state. The subscriber ID identifies a service subscriber associated with a service flow. The application ID identifies an application associated with a service flow. The service ID identifies a service of a service flow. The timer ID identifies a timer associated with a service flow. The event ID identifies an event associated with a service flow. The state may include an authentication state, an authorization state, an accounting state, and any other session states associated with a service flow.

The action category 734 indicates action capabilities of the SF, which may include basic actions, such as pass, drop, and report certain packets, and advanced actions, such as operations based on a certain antivirus (AV), an IPS signature, and an uniform resource locator (URL) filtering rule. The action may also include optional or additional functions, such as monitoring, logging, and notifications.

FIGS. 8A-8D illustrate an embodiment of a service layer interface model 800. The model 800 is employed across the orchestrator-controller interface 193 and controller-network interface 194 in the system 100 and across the VNF interface 293 in the system 200. The model 800 provides common mechanisms for a network management entity, such as the SF orchestrator 110 and the SF management system 210, to configure SFs, such as the SFs 150 and 251-253 and VNFs 330 and 340. The model 800 defines rules for a SF to process packets. In addition, the model 800 may define methods for a SF to monitor execution statuses of the SF. The model 800 extends the policy core information model (PCIM) defined in IETF request for comment (RFC) document 3060 titled "Policy Core Information Model—Version 1 Specification" by B. Moore, et al., published February 2001 to enable SF policy configurations as described by the model 700.

Figure 8A:
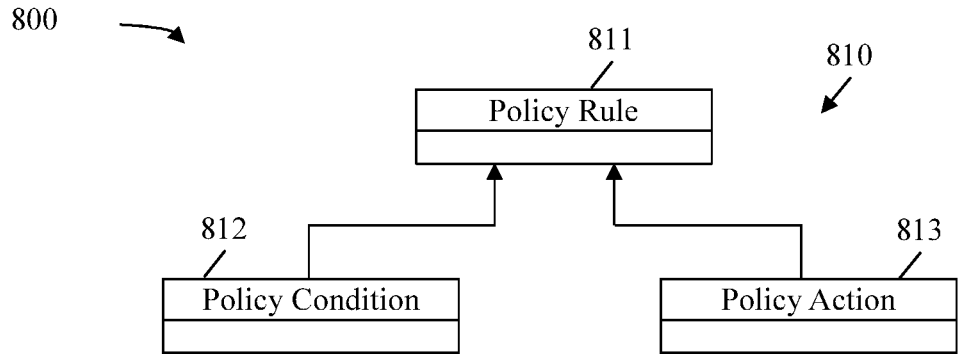
FIG. 8A is a schematic diagram of an embodiment of a service layer interface structure.

FIG. 8A is a schematic diagram of an embodiment of a service layer interface structure 810. The structure 810 comprises a policy rule 811 formed from a set of policy conditions 812 and a set of policy actions 813. The set of conditions 812 specify when the policy rule 811 is applicable. The set of actions 813 specify actions to be executed when the set of conditions 812 are satisfied.

Figure 8B:
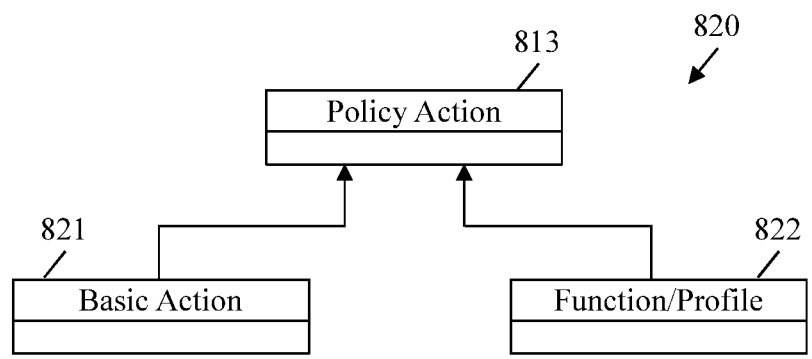
FIG. 8B is a schematic diagram of an embodiment of a policy action structure.

FIG. 8B is a schematic diagram of an embodiment of a policy action structure 820. The structure 820 illustrates a more detailed view of a policy action 813. As shown, the policy action 813 is formed from a set of basic actions 821 and a set of functions and/or profiles 822. The basic actions 821 include basic packet processing operations, such as packet drop and packet pass. The functions and/or profiles 822 include more specific methods and operations, for example, executing a new signature file or a statistical model provided by a client, such as the service clients 180 and 280.

Figure 8C:
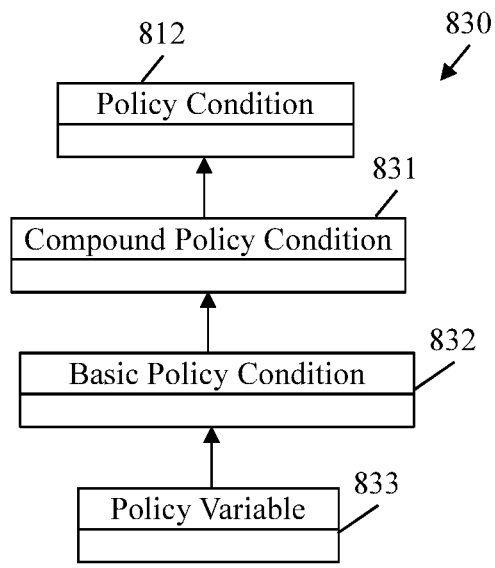
FIG. 8C is a schematic diagram of an embodiment of a policy condition structure.

FIG. 8C is a schematic diagram of an embodiment of a policy condition structure 830. The structure 830 illustrates a more detailed view of a policy condition 812. As shown, the policy condition 812 is expressed as a compound policy condition 831 formed from a set of basic policy conditions 832. Compound operators, such as logical OR, logical AND, and any other logical operators, may be applied to the set of basic policy conditions 832 to form the compound policy condition 831. The basic policy conditions 832 are formed from a set of policy variables 833.

Figure 8D:
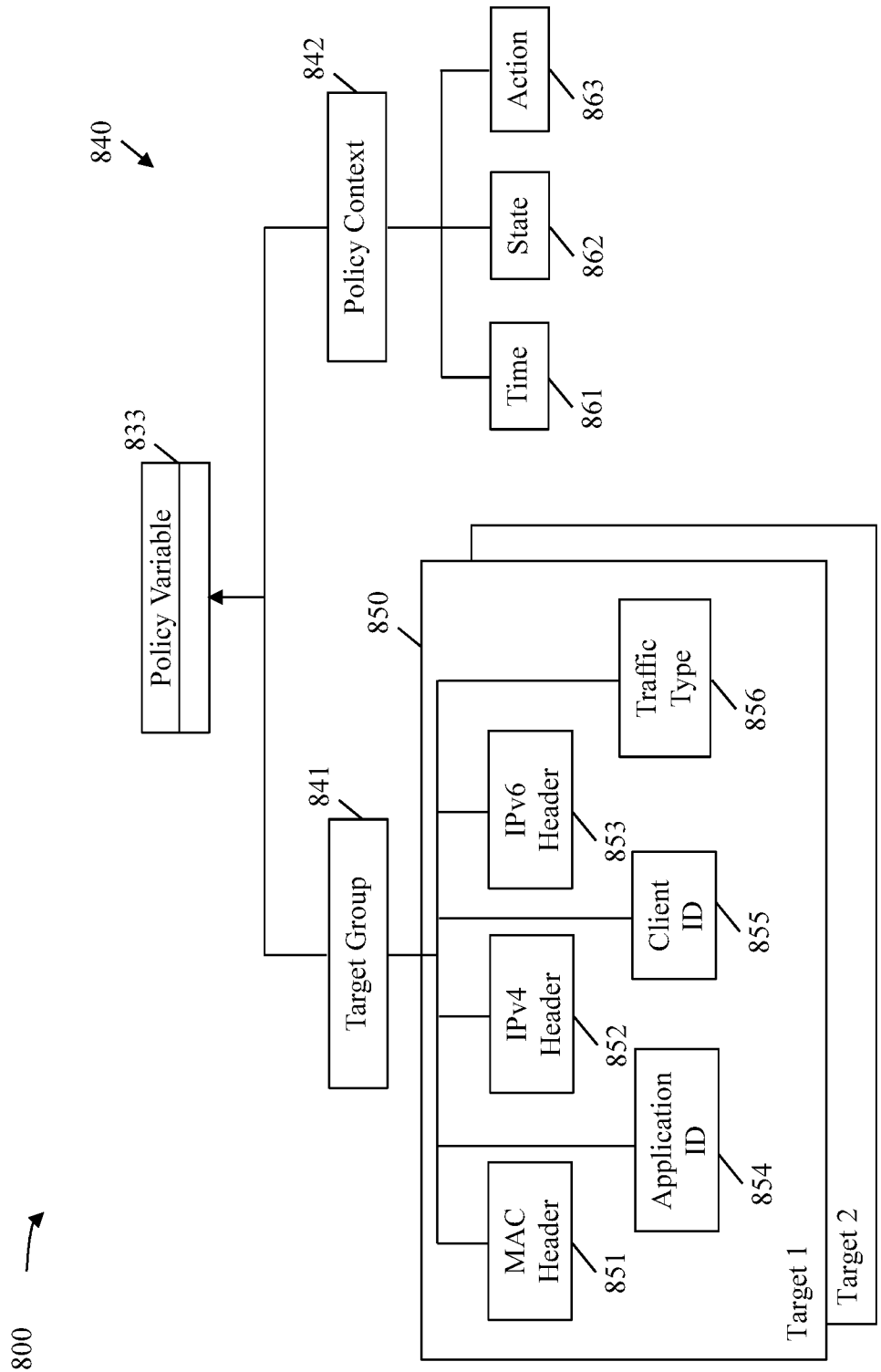
FIG. 8D is a schematic diagram of an embodiment of a policy variable structure.

FIG. 8D is a schematic diagram of an embodiment of a policy variable structure 840. The structure 840 illustrates a more detailed view of a policy variable 833. The policy variable 833 is formed from a target group 841 and a policy context 842. The target group 841 comprises a plurality of target groups 850. Each target group 850 comprises a MAC header component 851, an IPv4 header component 852, an IPv6 header component 853, an application ID component 854, a client ID component 855, and a traffic type component 856. The target groups 850 may be employed for matching a data flow. The policy context 842 comprises a time component 861, a state component 862, and an action component 863, which are associated with contextual states. It should be noted that the target groups 850 and the policy context 842 are configured to match the model 700. However, the targets groups 850 and the policy context 842 may be alternatively configured as determined by a person of ordinary skill in the art to achieve similar functionalities. In addition, the model 800 may be extended for use to express a policy group with aggregated policy rules 811.

Figure 9:
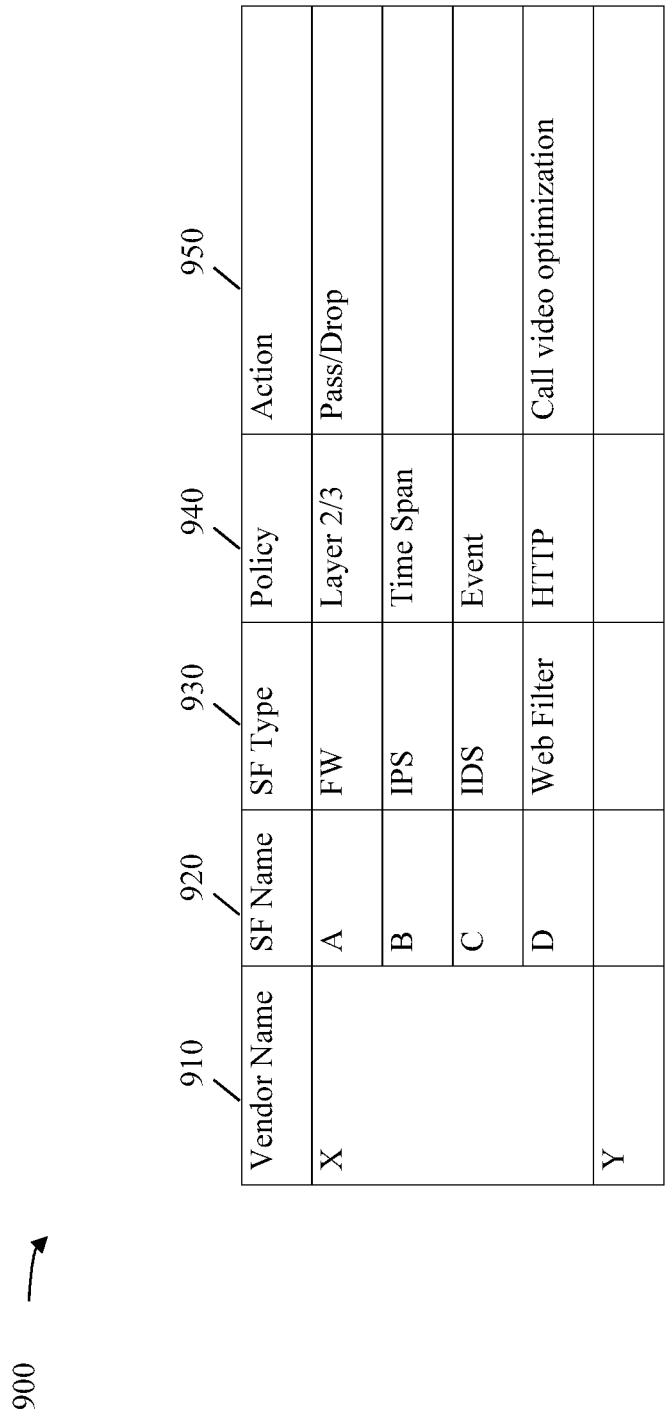
FIG. 9 is a schematic diagram of an embodiment of a portion of a SF catalog database (DB).

FIG. 9 is a schematic diagram of an embodiment of a portion of a SF catalog DB 900, such as the SF DBs 435. The DB 900 is generated by a SF orchestrator, such as the SF orchestrator 110 and the SF management system 210, based on SF basic information and capability information of SFs, such as the SFs 150 and 251-253 and VNFs 330 and 340, received from a VNF manager, such as the vendor-specific SF manager 160 and the VNF managers 261-263, during registration (e.g., in the method 500) and capability update (e.g., in the method 600). The DB 900 comprises a vendor name category 910, a SF name category 920, a SF type category 930, a supported policy category 940, and an action category 950. The vendor name category 910 stores vendor names (e.g., X and Y) of vendors that provide the SFs. The SF name category 920 stores SF names (e.g., A, B, C, and D) of the SFs. The SF type category 930 stores SF types (e.g., FW, IPS, IDS, and web filter) of the SF. The policy category 940 stores polices supported by the SFs, corresponding to the subject category 732 and the context category 733 of the model 700. The action category 950 stores actions supported by the SFs, corresponding to the action category 734 of the model 700. The DB 900 may be configured as shown or alternatively configured as determined by a person of ordinary skill in the art to achieve similar functionalities.

Figure 10:
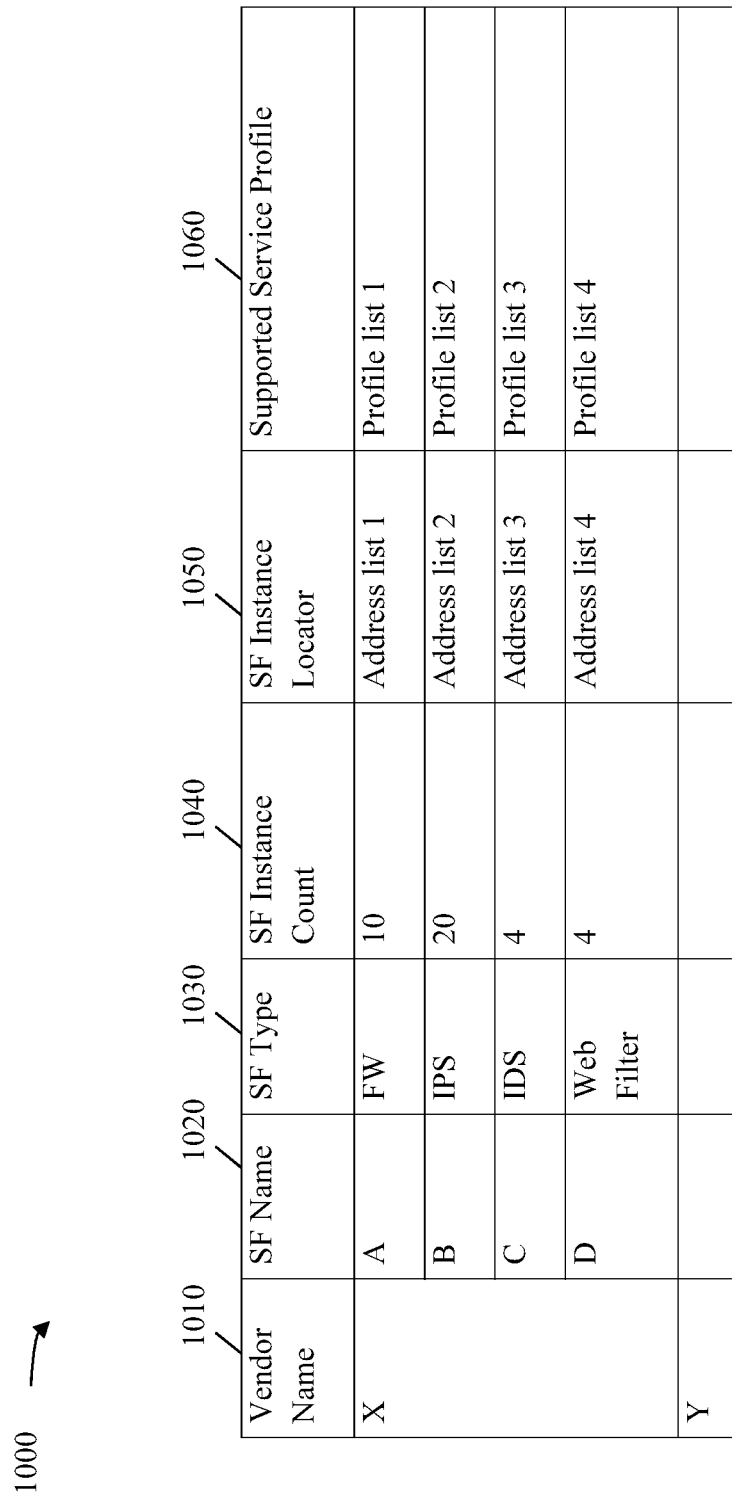
FIG. 10 is a schematic diagram of an embodiment of a portion of a SF instance DB.

FIG. 10 is a schematic diagram of an embodiment of a portion of a SF instance DB 1000, such as the SF DBs 435. The DB 1000 is generated by a SF orchestrator, such as the SF orchestrator 110 and the SF management system 210, based on SF instance information of SFs, such as the SFs 150 and 251-253 and VNFs 330 and 340, received from a VNF manager, such as the vendor-specific SF manager 160 and the VNF managers 261-263, during SF instance registration (e.g., in the method 500). The DB 1000 comprises a vendor name category 1010, a SF name category 1020, a SF type category 1030, a SF instance count category 1040, a SF instance locator category 1050, and a supported service profile category 1060. The vendor category 1010, the SF name category 1020, and the SF type category 1030 are similar to the vendor name category 910, the SF name category 920, and the SF type category 930, respectively. The SF instance count category 1040 stores a number of SF instances of a corresponding SF. The SF instance locator category 1050 stores a list of addresses of SF instances of a corresponding SF. The supported service profile category 1060 is similar to the policy category 940 and the action category 950. The DB 1000 may be configured as shown or alternatively configured as determined by a person of ordinary skill in the art to achieve similar functionalities. The DBs 900 and 1000 may be stored as separate DBs or as a single DB.

Figure 11:
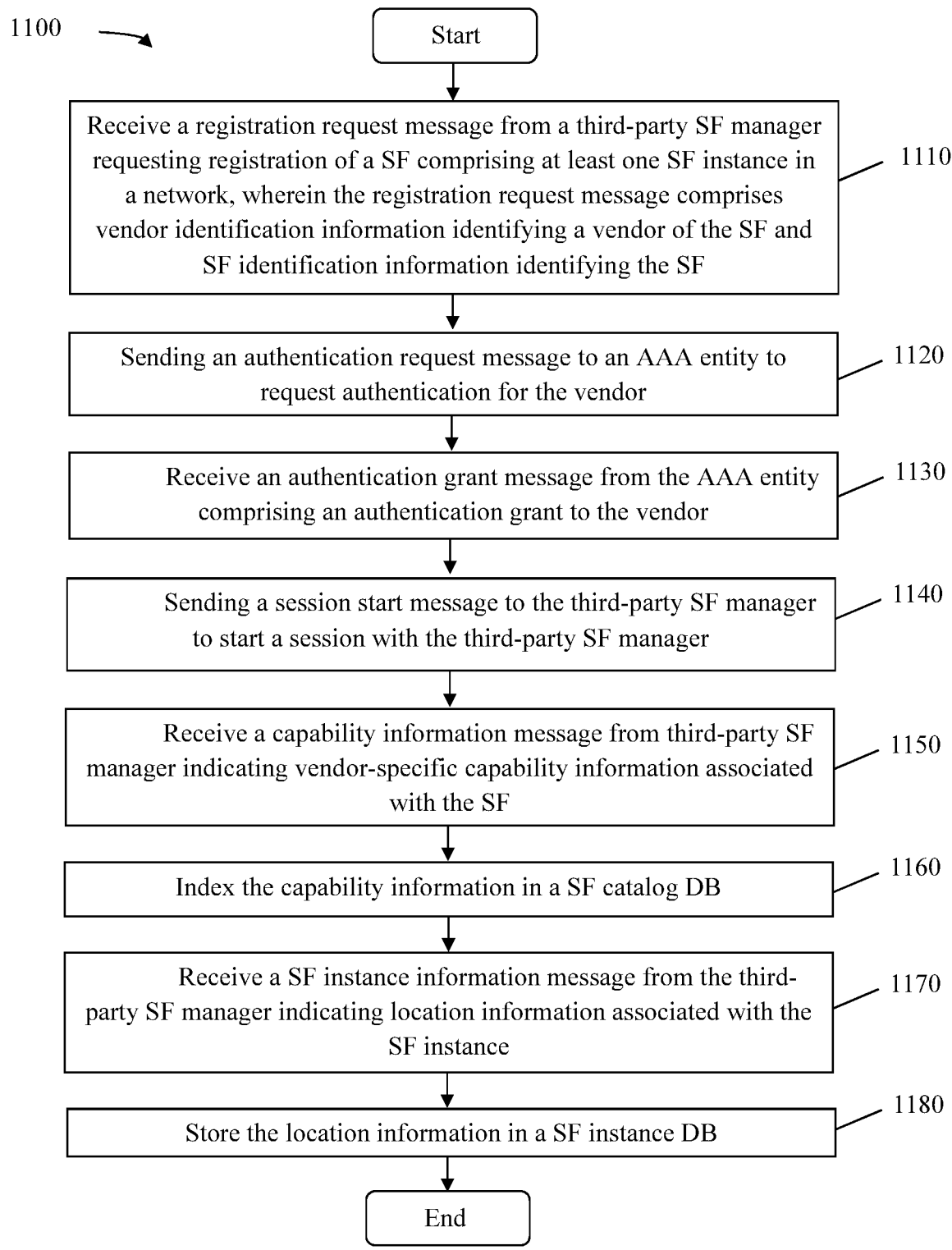
FIG. 11 is a flowchart of an embodiment of a method for performing SF registration.

FIG. 11 is a flowchart of an embodiment of a method 1100 for performing SF registration. The method 1100 is implemented by a SF orchestrator, such as the SF orchestrator 110 and the SF management system 210, and the NE 400. The method 1100 is implemented when a third-party SF manager, such as the vendor-specific manager 160 and VNF managers 261-263, registers a SF, such as the SFs 150 and 251-253 and VNFs 330 and 340, in a network, such as the systems 100 and 200, with the SF orchestrator. The method 1100 employs similar mechanisms as described in the systems 100 and 200 and the method 500. At step 1110, a registration request message is received from a third-party SF manager requesting registration of a SF comprising at least one SF instance of the SF in a network. The registration request message comprises vendor identification information identifying a vendor of the SF and SF identification information identifying the SF. At step 1120, an authentication request message is sent to an AAA entity to request authentication for the vendor. At step 1130, an authentication grant message is received from the AAA entity comprising an authentication grant to the vendor. At step 1140, after receiving the authentication grant message, a session start message is sent to the third-party SF manager to start a session with the third-party SF manager. At step 1150, a capability information message is received from the third-party SF manager indicating vendor-specific capability information associated with the SF. For example, the capability information is expressed in the form of the model 700. At step 1160, the capability information is indexed in a SF catalog DB similar to the DBs 900 and 435. At step 1170, a SF instance information message is received from the third-party SF manager indicating location information associated with SF instance. At step 1180, the location information is stored in a SF instance DB similar to the DBs 1000 and 435. The formats of the SF registration request message, the session start message, the capability information message, and the SF instance information message are described more fully below.

Figure 12:
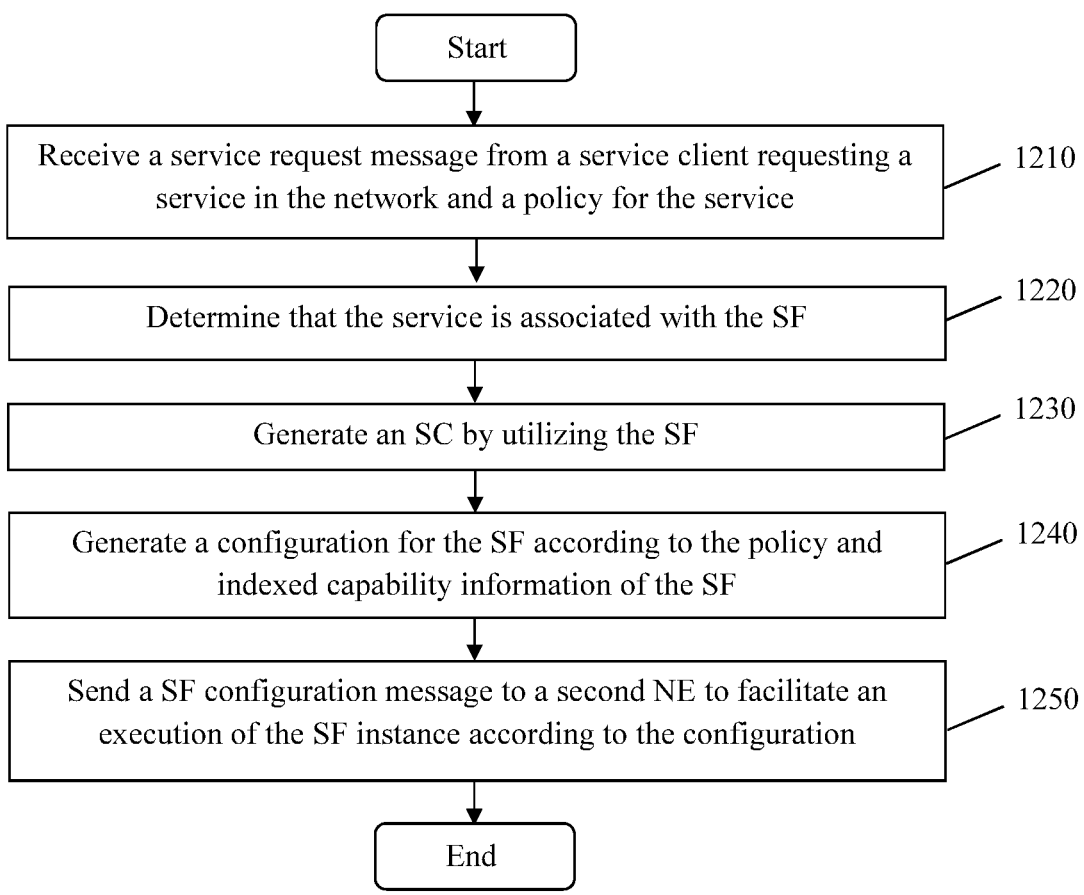
FIG. 12 is a flowchart of an embodiment of a method 1200 for configuring a SF.

FIG. 12 is a flowchart of an embodiment of a method 1200 for configuring a SF, such as the SFs 150 and the VNFs 330 and 340. The method 1200 is implemented by a SF orchestrator, such as the SF orchestrator 110 and the SF management system 210, and the NE 400. The method 1200 employs similar mechanisms as described in the systems 100 and 200. The method 1200 is implemented after completing registration of the SF with a third-party SF manager, such as the third-party SF manager 160 and the VNF managers 261-263, in network, such as the systems 100 and 200. For example, the registration is performed by employing the method 1100, and capability information of the SF is indexed in a SF catalog DB, such as the DBs 900, 1000, and 435. At step 1210, a service request message is received from a client, such as the service clients 180 and 280, requesting a service in the SC-enabled network and a policy for the service. The client's policy comprises service-oriented rules, such as high-level or abstract permission controls for traffic. At step 1220, a determination is made that the service is associated with the SF. For example, the SF orchestrator analyzes the request, selects the SF to satisfy the request, and generates an SC to utilize the SF. At step 1230, an SC is generated by utilizing the SF. The generation of the SC may include determinations of classification policy and forwarding policy for instantiating the SC in the SC-enabled network. At step 1240, a configuration is generated for the SF according to the policy and indexed capability information of the SF indexed in the SF catalog DB. For example, the SF configuration is in the form of the model 800. At step 1250, a SF configuration message is sent to facilitate an execution of the SF instance according to the SF configuration. For example, the SF configuration message comprises the classification policy and the forwarding policy. The SF configuration message may be sent to a SDN controller such as the SDN controller 120 or a VNF controller such as the VNF controller 310.

Figure 13:
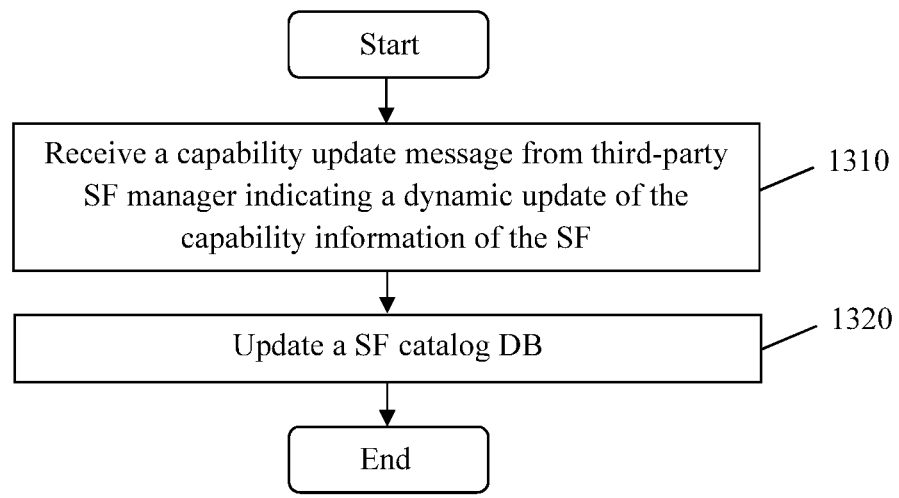
FIG. 13 is a flowchart of an embodiment of a method 1300 for dynamically updating capabilities of a SF.

FIG. 13 is a flowchart of an embodiment of a method 1300 for dynamically updating capabilities of a SF, such as the SFs 150 and 251-253 and VNFs 330 and 340, in an SC-enabled network, such as the systems 100 and 200. The method 1300 is implemented by a SF orchestrator, such as the SF orchestrator 110 and the SF management system 210, and the NE 400. The method 1300 is similar to the method 600. The method 1300 is implemented after completing registration of the SF with a third-party SF manager, such as the vendor-specific SF manager 160 and the VNF managers 261-263, in the SC-enabled network. For example, the registration is performed by employing the method 1100, and capability information of the SF is indexed in a SF catalog DB, such as the DBs 900 and 435. At step 1310, a capability update message is received from a third-party SF manager indicating a dynamic update of the capability information of the SF. The capability update message comprises similar information categories as the model 700. At step 1320, the SF catalog DB is updated according to the received dynamic update.

Figure 14:
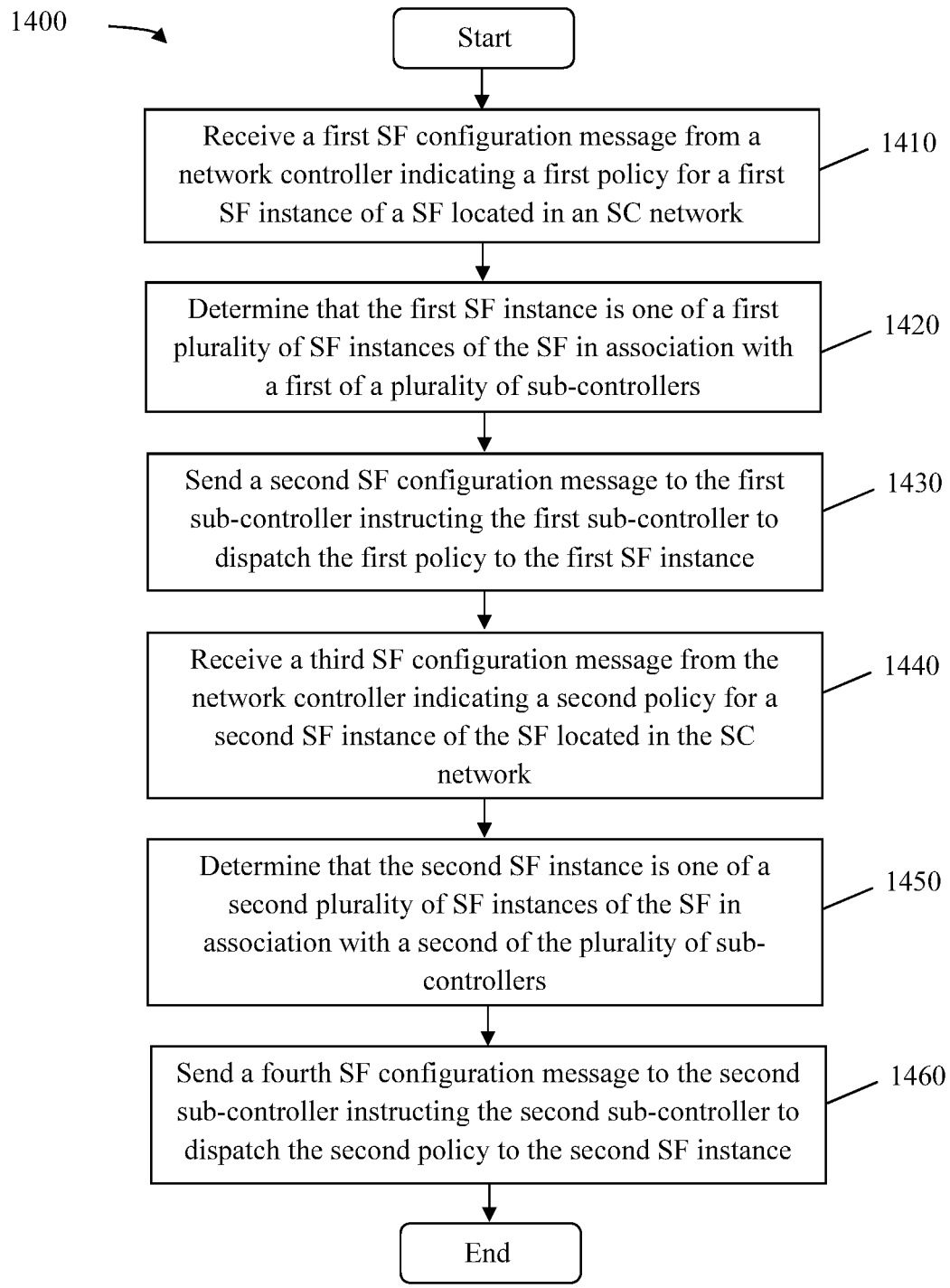
FIG. 14 is a flowchart of an embodiment of a method for managing a hierarchical VNF controller system.

FIG. 14 is a flowchart of an embodiment of a method 1400 for managing a hierarchical VNF controller system, such as the system 300. The method 1400 is implemented by a VNF controller, such as the VNF controller 310 and the NE 400. The method 1400 is implemented when dispatching SF configuration to SFs, such as the SFs 150 and 251-253, in an SC-enabled network, such as the systems 100 and 200, managed by sub-controllers, such as the sub-controllers 320. At step 1410, a first SF configuration message is received from a network controller, such as the SDN controller 120, indicating a first policy for a first SF instance of a SF located in the SC network. At step 1420, a determination is made that the first SF instance is one of a first plurality of SF instances of the SF in association with a first of a plurality of sub-controllers. For example, the first SF instance corresponds to a VNF 330 in the VNF-A cluster and the first sub-controller corresponds to the sub-controller A 320. At step 1430, a second SF configuration message to the first sub-controller instructing the first sub-controller to dispatch the first policy to the first SF instance. At step 1440, a third SF configuration message is received from the network controller indicating a second policy for a second SF instance of the SF located in the SC network. At step 1450, a determination is made that the second SF instance is one of a second plurality of SF instances of the SF in association with a second of the plurality of sub-controllers. For example, the second SF instance corresponds to a VNF 340 in the VNF-B cluster and the second sub-controller corresponds to the sub-controller B 320. At step 1460, a fourth SF configuration message is sent to the second sub-controller instructing the second sub-controller to dispatch the second policy to the second SF instance.

Figure 15:
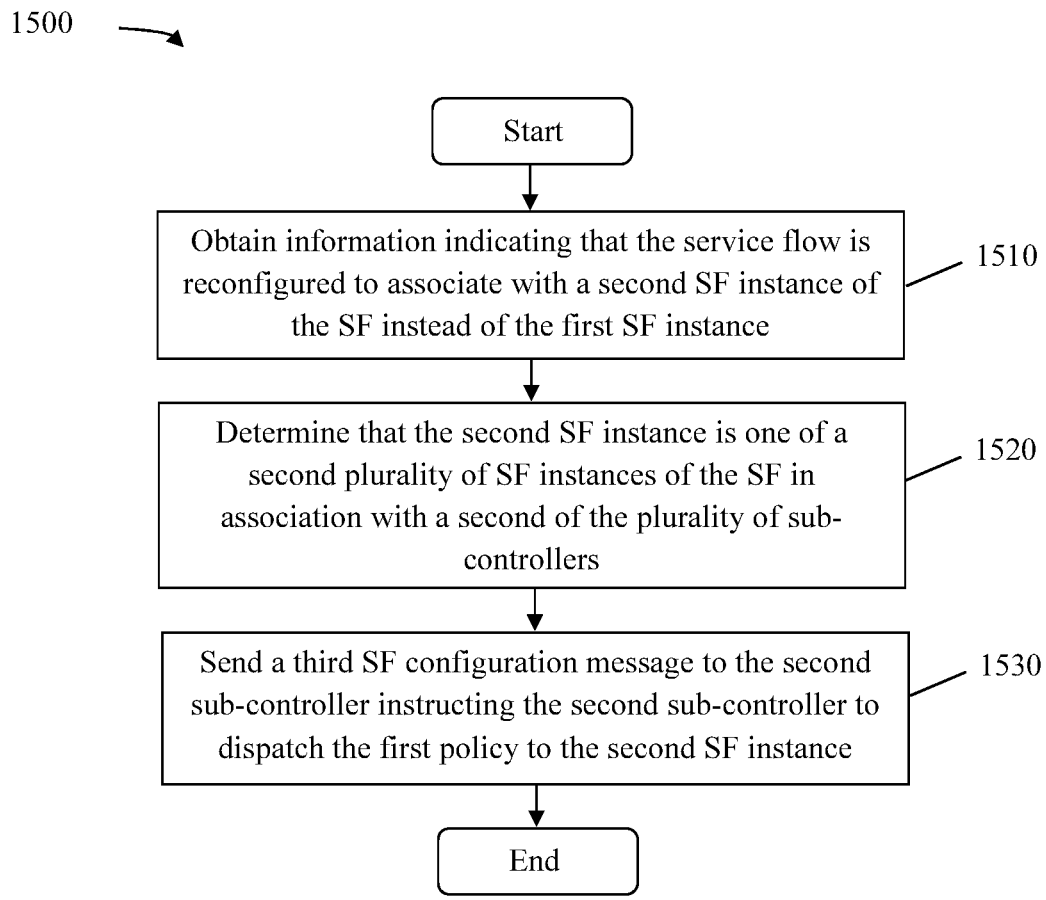
FIG. 15 is a flowchart of another embodiment of a method for managing a hierarchical VNF controller system.

FIG. 15 is a flowchart of another embodiment of a method 1500 for managing a hierarchical VNF controller system, such as the system 300. The method 1500 is implemented by a VNF controller, such as the VNF controller 310 and the NE 400. The method 1500 is implemented when a service flow associated with a first instance of a SF, such as the SFs 150 and 251-253 and VNFs 330 and 340, is reconfigured in an SC-enabled network, such as the systems 100 and 200. At step 1510, information indicating that the service flow is reconfigured is obtained, where the reconfiguration associates the service flow with a second SF instance of the SF instead of the first SF instance. The first SF instance is an instantiation of the SF associated with the service flow. At step 1520, a determination is made that the second SF instance is one of a second plurality of SF instances of the SF in association with a second of the plurality of sub-controllers. For example, the VNF controller previously received a first policy for the first SF instance when the first SF instance is associated with the service flow. At step 1530, a third SF configuration message is sent to the second sub-controller instructing the second sub-controller to dispatch the first policy to the second SF instance. For example, the VNF controller may move or copy the first policy from the first SF instance to the second SF instance.

Figure 16:
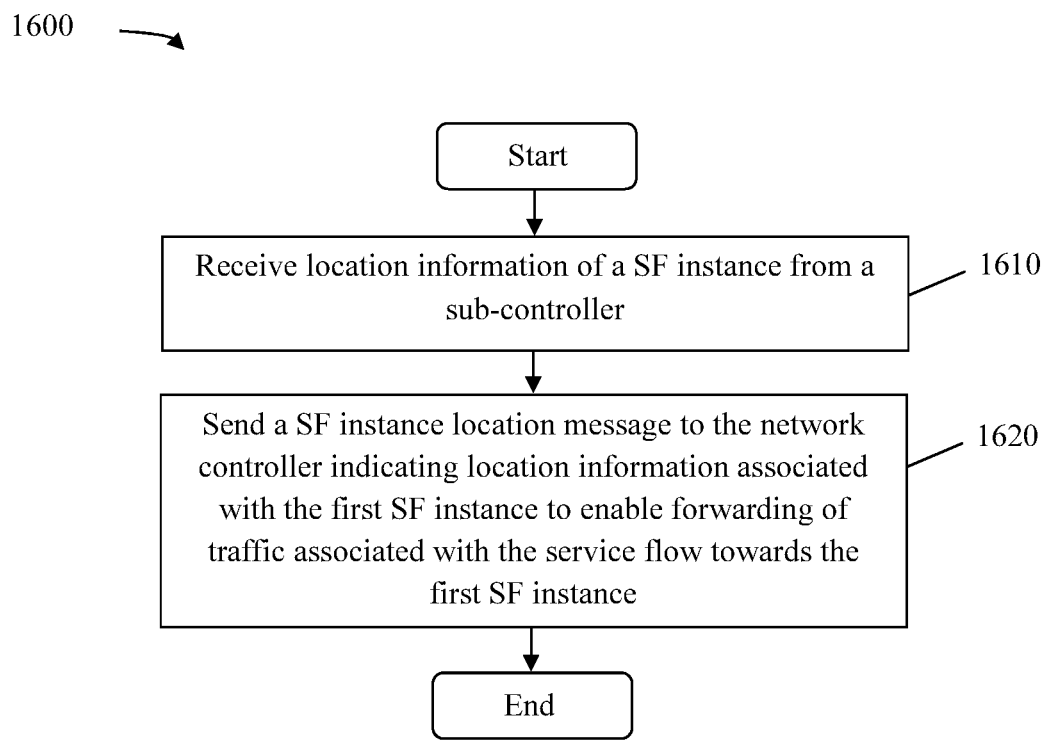
FIG. 16 is a flowchart of an embodiment of a method for facilitating traffic forwarding in a service flow.

FIG. 16 is a flowchart of an embodiment of a method 1600 for facilitating traffic forwarding in a service flow, such as the service flow 183, in an SC-enabled network, such as the systems 100 and 200. The method 1600 is implemented by a VNF controller, such as the VNF controller 310 and the NE 400, in a hierarchical VNF controller system, such as the system 300. For example, the VNF controller manages a pool of instances of a SF, such as the SFs 150 and 251-253 and VNFs 330 and 340 in the network. The method 1600 is implemented after a network controller, such as the SDN controller 120, configures a service flow in the network, where the service flow traverses through a first of the SF instances. For example, the first SF instance is controlled by a sub-controller, such as the sub-controllers 320, controlled by the VNF controller. At step 1610, location information of the SF instance is received from a sub-controller. At step 1620, a SF instance location message is sent to the network controller indicating location information associated with the first SF instance to enable forwarding of traffic associated with the service flow towards the first SF instance.

The following embodiments illustrate details of messages exchanged between a VNF manager, such as the vendor-specific SF manager 160 and the VNF managers 261-263, and a SF orchestrator, such as the SF orchestrator 110 and the SF management system 210, during a registration process, such as the methods 500 and 1100. The following shows an example data type for a SF registration request message sent by an VNF manager (e.g., at step 510):

```
Registration_Request_Data_Type {
    Vendor name: String;
    Vendor code: uint32;
    List of SFs {
        SF name:           String;
        SF type:           String;
        SF ID:             uint32;
    }
}
```

The Vendor name field comprises a string indicating the name of the vendor that provides the SF. The Vendor code field comprises an unsigned 32-bit integer (uint32) indicating a vendor code of the vendor. For example, the Vendor code may be pre-approved to operate in a network of the SF orchestrator. The SF name field comprises a string indicating the name of the SF. The SF type field comprises a string indicating the SF type of the SF. The SF ID field comprises an uint32 indicating an ID of the SF.

The following shows an example data type for a session start message sent by a SF orchestrator (e.g., at step 530):

```
Session_Start_Data_Type {
    Session ID:          uint32
    Session Key:         unit32
    Interested_SF: list of SF ID
}
```

The Session ID field comprises an uint32 identifying a session between the SF orchestrator and the VNF. The Session Key field comprises an unit32 identifying a key for use in the session. The Interested_SF indicates a list of SFs of interest to the SF orchestrator by SF IDs.

The following shows an example data type of a capability information message sent by an VNF manager (e.g., at step 535):

```
SF_Capability_Data_Type {
    Session_ID:     uint32
    Vendor name:    String;
    Vendor code:    uint32;
    SF name:        String;
    SF type:        String;
    SF ID:          uint32;
    Subject:        Supported_Header;
    Context:        Supported_Context;
    Action:         Supported_Action;
    Function:       Supported_Function;
};
```

The Subject field comprises Supported_Header data indicating header types supported or inspected by a SF. The Context field comprises Supported_Context data indicating contextual states supported or maintained by the SF. The Action field comprises Supported_Action data indicating actions that may be applied by the SF. The Function field comprises Supported_Function data indicating additional functions that may be called by the SF.

The following shows an example of a Supported_Header data type:

```
Supported_Header {
    Instance_Ctrl:            IPv6/IPv4
    SC_header:                {NSH, VLAN, MPLS}
    Supported_L2_header:      {src addr/dst
                               addr/s-VID/c-ID/EtherType}
    Supported_L3_header_IPv4: {src port/addr, dst port/addr, DSCP,
                               Length, Flags, TTL}
    Supported_L3_header_IPv6:
    Supported_TCP_flags
```

```
    Supported_SCTP
    Supported_DCCP
    Supported_UDP_flags
    HTTP_Layer
    IETF_PCP:            Bealoon;
}
```

The Instance_Ctrl field indicates whether the SF supports IPv6 and/or IPv4 processing. The SC_header field indicates SC header type supported by the SF. For example, the SC_header field may indicate NSH, virtual local area network (VLAN), and/or multiprotocol label switching (MPLS). The Supported_L2 header field indicates OSI layer 2 header fields supported by the SF. For example, the Supported_L2 header field may indicate a source address (src addr), a destination address (dst addr), a service-VLAN ID (s-VID), a customer-VLAN ID (c-VID), an Ethernet type (EtherType), and/or any other L2 header fields. The Supported_L3 header_IPv4 field indicates IPv4 header fields supported by the SF. The Supported_L3 header_IPv4 field may indicate a source port (src port), a src addr, a destination port (dst port), a dst addr, a differentiated services code point (DSCP) field, a length, flags, a time-to-live (TTL) field, and/or any other IPv4 header fields. The Supported_L3 header_IPv6 field indicates IPv6 header fields supported by the SF and may be any IPv6 header fields. The Supported TCP_flags field indicates TCP flags supported by the SF. The Supported_SCTP field, the Supported_DCCP field, the Supported_UDP_flags field, and the HTTP_layer field indicates SCTP packet fields, DCCP packet fields, UDP packet fields, and HTTP layer fields supported by the SF. The IETC_PCP field indicates whether the SF supports the IETF PCP.

The following shows an example of a Supported_Context data type:

```
Supported_Context {
    Timer:       {time span, Start_time-Stop-time;
    Direction:   {none, congruency, Origination, Response, ..};
    Events:      list of {URL}
    Session:     {TCP sequence, flag, }
    State:       {authentication state, Authorization state, Accounting
                 state, session state, ..}
}
```

The Timer field indicates a timing context supported by the SF. For example, the Timer field may indicate a time span, a start time, and a stop time. The Direction field indicates flow direction supported by the SF. The Events field indicates events supported by the SF. The Session field indicates session-related parameters supported by the SF. The State field indicates processing states supported by the SF.

The following shows an example of a Supported_Action data type:

```
Supported_Action {
    Action_list:   {pass, drop, mirror, function call, Count (min, max,
                   hours/day),..}
    Egress_encap:  {NSH, VxLAN, ..}
}
```

The Action_list field indicates a list of actions supported by the SF. The Egress_encap field indicates the types of egress encapsulation supported by the SF.

The following shows an example of a Supported_Function data type:

```
Supported_Function {
    Function_URL:        string;
}
```

The Function_URL field indicates additional functions that may be called by the SF.

The following shows an example data type for a SF instance registration request message send by a VNF manager (e.g., at step 550):

```
SF_Instance_Data_Type{
SF ID: uint32;
Instance_locator:   List of {IPv4 addresses, IPv6 addresses, connection
                    types}
```

The SF ID field comprises an uin32 indicating an ID identifying a SF. The Instance_locator field comprises a list of location information of instances of the SF. For example, the location information may include an IPv4 address, an IPv6 address, and a connection type.

In an embodiment, customers may employ the disclosed mechanisms to enroll and/or cancel subscriptions to VNFs. In another embodiment, a network operator may employ the disclosed embodiments to configure VNF based on specific configurations or common security policies. In some other embodiments, a network operator may employ the disclosed embodiments to retrieve characteristics of VNFs and advertise the VNFs to customers through commercial channels.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented in a network engine comprising:

receiving, by a receiver of a service function (SF) orchestrator in the network engine, a registration request message from a third-party SF manager requesting registration of a SF comprising one or more SF instances in a network, wherein the registration request message comprises vendor identification information identifying a vendor of the SF and SF identification information identifying the SF;

receiving, by the receiver of the SF orchestrator, a capability information message from the third-party SF manager indicating vendor-specific capability information associated with the SF;
receiving, by the receiver of the SF orchestrator, a service request message from a service client requesting a network service and one or more policies for the network service, wherein the service request message comprises the one or more policies for the network service;
generating, by a processor of the SF orchestrator, the network service by utilizing the one or more SF instances according to the one or more policies and the vendor-specific capability information; and
sending, by the processor of the SF orchestrator, the one or more policies to the one or more SF instances to facilitate an execution of the network service requested by the service client.

2. The method of claim 1, wherein the vendor identification information comprises:
a vendor name of the vendor; and
a vendor identifier (ID) identifying the vendor, and
wherein the SF identification information comprises:
a SF name of the SF;
a SF type identifying a service type of the SF; and
a SF ID identifying the SF.

3. The method of claim 1, further comprising:
sending, by the SF orchestrator, an authentication request message to an authentication, authorization, and accounting (AAA) entity to request authentication for the vendor; and
receiving, by the SF orchestrator, an authentication grant message from the AAA entity comprising an authentication grant to the vendor.

4. The method of claim 3, further comprising sending, by the SF orchestrator, a session start message to the third-party SF manager to start a session with the third-party SF manager after receiving the authentication grant message, wherein the capability information message is received after sending the session start message.

5. The method of claim 4, wherein the SF identification information comprises a SF identifier (ID) identifying the SF, and wherein the session start message comprises:
a session ID identifying the session;
a session key associated with the session; and
the SF ID indicating that the SF is registered for the session.

6. The method of claim 1, further comprising:
receiving, by the SF orchestrator, a SF instance information message from the third-party SF manager indicating location information associated with the SF instance in the network; and
storing the location information in a SF instance database (DB).

7. The method of claim 1, further comprising receiving, by the SF orchestrator, a capability update message from the third-party SF manager indicating a dynamic update of the capability information of the SF.

8. The method of claim 1, wherein the capability information message indicates a policy supported by the SF, and wherein the policy comprises a packet-level inspection depth, a contextual state, and an action supported by the SF.

9. The method of claim 1, wherein the SF is associated with network security.

10. A virtual network function (VNF) controller implemented in a service chain (SC)-enabled network, comprising:
a memory comprising instructions;
a processor coupled to the memory and configured to execute the instructions, which cause the processor to be configured to:
receive a first service function (SF) configuration message from a network controller comprising a first policy for a first SF instance of a SF located in a network;
determine that a first of a plurality of sub-controllers is configured to manage a first plurality of SF instances of a first type of SF distributed across service nodes in the SC-enabled network, wherein the first SF instance is one of the first plurality of SF instances; and
send a second SF configuration message to the first sub-controller instructing the first sub-controller to dispatch the first policy to the first SF instance.

11. The VNF controller of claim 10, wherein the first SF instance is associated with a service flow in the network, wherein the instructions further cause the processor to be configured to:
obtain information indicating that the service flow is associated with a second SF instance of the SF instead of the first SF instance; and
determine that the second SF instance is one of a second plurality of SF instances of the SF in association with a second of the plurality of sub-controllers, and
send a third SF configuration message to the second sub-controller instructing the second sub-controller to dispatch the first policy to the second SF instance.

12. The VNF controller of claim 10, wherein the instructions further cause the processor to be configured to:
receive a third SF configuration message from the network controller indicating a second policy for a second SF instance of the SF located in the network, wherein the first policy and the second policy are different;
determine that the second SF instance is one of a second plurality of SF instances of the SF in association with a second of the plurality of sub-controllers; and
send a fourth SF configuration message to the second sub-controller instructing the second sub-controller to dispatch the second policy to the second SF instance.

13. The VNF controller of claim 10, wherein the first SF instance is associated with a service flow in the network, and wherein the instructions further cause the processor to be configured to send a SF instance location message to a software-defined networking (SDN) controller indicating location information associated with the first SF instance to enable forwarding of traffic associated with the service flow towards the first SF instance.

14. A method implemented in a network engine comprising:
receiving, by a receiver of a service function (SF) orchestrator in the network engine, a capability information message from a third-party SF manager indicating a SF name of a SF in a network and vendor-specific capability information describing a capability of the SF provided by a vendor;
indexing, by a processor of the SF orchestrator, the vendor-specific capability information in a SF catalog database (DB);
receiving, by the receiver of the SF orchestrator, a service request message from a service client requesting a service in the network and a policy for the service, wherein the service request message comprises the policy for the service;
determining, by the processor of the SF orchestrator, that the service is associated with the SF;

generating, by the processor of the SF orchestrator, a configuration for the SF according to the policy and the indexed vendor-specific capability information; and sending, by the transmitter of the SF orchestrator, a SF configuration message to a network element (NE) to facilitate an execution of the SF according to the configuration.

15. The method of claim 14, wherein the capability information message comprises:
   a supported header field indicating a packet-level inspection depth supported by the SF;
   a supported context field indicating a contextual state maintained by the SF;
   a supported action field indicating an action supported by the SF; and
   a supported function field indicating a function supported by the SF in addition to functionalities of the SF.

16. The method of claim 15, wherein the packet-level inspection depth is associated with a service chain (SC) encapsulation protocol, a media access control (MAC) protocol, an Internet protocol version 4 (IPv4) protocol, an Internet protocol version 6 (IPv6) protocol, a transmission control protocol (TCP), an user datagram protocol (UDP), a hypertext transfer protocol (HTTP), or combinations thereof.

17. The method of claim 15, wherein the contextual state is associated with time, a traffic flow direction, an authentication state, an authorization state, an accounting state, a session state, or combinations thereof.

18. The method of claim 15, wherein the action is associated with a network security comprising an antivirus (AV) operation, an intrusion protection system (IPS) operation, an uniform resource locator (URL) filtering operation, a file blocking operation, a data filtering operation, an application control operation, or combinations thereof.

19. The method of claim 15, wherein indexing the vendor-specific capability information comprises:
   indexing the SF name under a name category in the SF catalog DB;
   indexing the supported header field under a subject category in the SF catalog DB;
   indexing the supported context field under a context category in the SF catalog DB;
   indexing the supported action field under an action category in the SF catalog DB; and
   indexing the supported action field under a function category in the SF catalog DB.

20. The method of claim 15, wherein generating the configuration for the SF comprises:
   generating a policy condition according to the supported header field and the supported context field in the capability information message and the policy in the service request message;
   generating a policy action according to the supported action field in the context field in the capability information message and the policy in the service request message; and
   generating a policy rule according to the policy condition and the policy action and the policy in the service request message.

* * * * *

UNITED STATES PATENT AND TRADEMARK OFFICE
CERTIFICATE OF CORRECTION

PATENT NO. : 10,587,698 B2
APPLICATION NO. : 15/044010
DATED : March 10, 2020
INVENTOR(S) : Linda Dunbar et al.

It is certified that error appears in the above-identified patent and that said Letters Patent is hereby corrected as shown below:

On the Title Page

Page 3, Column 1, item [56], Other Publications, Lines 32-34, should read:
DUNBAR, L., et al., "Interface to Network Security Functions (I2NSF) Problem Statement," draft-dunbar-i2nsf-problem-statement-05.txt, May 28, 2015, 21 pages.

Signed and Sealed this
Twenty-sixth Day of May, 2020

Andrei Iancu
*Director of the United States Patent and Trademark Office*